United States Patent [19]

Shikata

[11] Patent Number: 4,692,070
[45] Date of Patent: Sep. 8, 1987

[54] CUTTING TOOL

[75] Inventor: Hiroshi Shikata, Yokohama, Japan

[73] Assignee: Kabushiki Kaisha Toshiba, Kawasaki, Japan

[21] Appl. No.: 900,410

[22] Filed: Aug. 26, 1986

Related U.S. Application Data

[63] Continuation-in-part of Ser. No. 657,126, Oct. 3, 1984, Pat. No. 4,636,117.

[30] Foreign Application Priority Data

Apr. 12, 1984 [JP] Japan .................................. 59-73570

[51] Int. Cl.$^4$ ........................ B23B 27/00; B23B 27/16
[52] U.S. Cl. .................................... 407/104; 407/113; 407/62
[58] Field of Search ................... 407/7, 103, 104, 105, 407/113, 114, 62; 82/1 C

[56] References Cited

U.S. PATENT DOCUMENTS

| | | | |
|---|---|---|---|
| 2,383,958 | 9/1945 | DeVlieg | 407/7 |
| 3,670,380 | 6/1972 | Moore et al. | 407/113 |
| 4,181,049 | 1/1980 | Borisenko et al. | 82/1 C |
| 4,252,480 | 2/1981 | Mizuno et al. | 408/223 |
| 4,636,117 | 1/1987 | Shikata | 407/104 |

FOREIGN PATENT DOCUMENTS

| | | | |
|---|---|---|---|
| 2108619 | 8/1972 | Fed. Rep. of Germany . | |
| 958587 | 9/1949 | France | 407/7 |
| 1183487 | 1/1959 | France | 407/120 |
| 1399654 | 4/1964 | France . | |
| 2164302 | 7/1973 | France | 407/114 |
| 2483819 | 12/1981 | France . | |
| 607770 | 9/1948 | United Kingdom | 407/7 |
| 1017309 | 1/1966 | United Kingdom . | |
| 1140841 | 1/1969 | United Kingdom . | |
| 1303811 | 1/1973 | United Kingdom . | |

Primary Examiner—Nicholas P. Godici
Assistant Examiner—Jerry Kearns
Attorney, Agent, or Firm—Schwartz, Jeffery, Schwaab, Mack, Blumenthal & Evans

[57] ABSTRACT

An oblique edged cutting tool comprises a holder at the front end of which is formed an inclined surface on which a tip is detachably mounted by means of an attaching member. The tip to be used is of an indexable throw-away type having an outer configuration radially symmetrical about its geometric center and the tip is provided with a curved cutting edge on the outer periphery thereof. The tip is attached to the holder of the oblique edged cutting tool so that the tip is positioned so that the curved cutting edge of the tip projects outwardly towards the surface of a work to be machined.

12 Claims, 75 Drawing Figures 506a
506b

CUTTING TOOL

This is a continuation-in-part-application of U.S. patent application Ser. No. 657,126 filed 10-3-84 now U.S. Pat. No. 4636117 issued 1/13/87.

BACKGROUND OF THE INVENTION

This invention relates to an oblique edged cutting tool provided with a shank portion to a front end of which a flat cutting tip of an indexable throw-away type having an outer configuration radially symmetrical about its geometric center is detachably attached.

In the art of this field, a work is generally cut to obtain a finely machined surface by a cemented carbide cutting tool with high speed-minute feed cutting amount or by a high speed steel tool such as a spring tool with low speed-high feed cutting, and in a rare case, an oblique edged tool is utilized at relatively high speed and with relatively high feed cutting amount as shown in FIGS. 1 and 2.

In FIGS. 1 and 2, the oblique edged tool 1 is generally made of a high speed steel and the cutting edge of the tool is integrally formed with a holder 3, which is referred to herein as a holder or shank of the tool. The inclination $\alpha$ of the cutting edge is usually selected in a range of $45° \sim 70°$.

FIG. 3 is a perspective view showing cutting condition in use of the oblique edged tool 1 shown in FIGS. 1 and 2, in which the oblique edged tool 1 which is fed at a feeding amount f with respect to a work 4 rotating with the revolution numbers N performs a cutting operation in contact with a point P of the cutting edge positioned in the same level of an axis O–O' of the work. In FIG. 3, the inclination i is determined by a line m which is the extension of the cutting edge of the oblique edged tool 1 and a line l normal to a cutting velocity direction V (hereinafter may be called merely cutting direction) at the point P of the cutting edge, and in a usual cutting operation in use of a lathe, the direction of the line l substantially accords with the feeding direction of the tool.

However, with the oblique edged tool 1 of the type described above, it is required to regrind the cutting edge 2 every time the cutting edge 2 wears, and after the cutting edge is reground several times, it is necessary to finally dispose of the holder 3 itself, which is not economical.

An oblique edged tool 5 as shown in FIG. 4 has been proposed for obviating the disadvantages described above, in which a tip 6 provided with a cutting edge 7 is detachably fitted to the holder 3 through a keep member 9. Although the tip 6 adapted for the oblique edged tool 5 is provided with two or more cutting edges 7, even a specifically made rectangular tip 6 can provide only four cutting edges 7 defined by the longitudinal four edges of the rectangular tip 6. For this reason, it is required to provide a tip having a lot of cutting edges for the purposes of reducing tip exchanging times and using economically cutting edges. However, in comparison with a non-oblique edged tool with an indexable throw-away type standard tip (a tip made in accordance with ISO, International Organization for Standardization, called hereinafter merely a standard tip), the oblique edged tool 5 with the specifically made rectangular tip 6 seems at a glance to have a long cutting edge 7 contacting the work, so that the application of indexable throw-away type standard tips widely used in tip manufacturing makers to an oblique edged tool is not considered up to today's standard. Moreover, the specifically made rectangular tip 6 can be manufactured from a limited number of substances and is not economical in comparison with the standard tip. Furthermore, the keep member 9 for keeping the tip 6 to the holder 3 projects over the holder surface, so that it is difficult for an operator to observe the cutting edge 7 during the cutting operation. In addition, when the bolt 8 is excessively rotated, there is a fear of falling down the keep member 9, thus adversely affecting the cutting operation.

In another aspect of the prior art of cutting tool having a rod-like shank portion to a front end of which a cutting tip made of a cemented carbide or ceramics is attached has widely been used for a various kinds of machine tools such as a lathe, boring machine and a shaping machine. In a well-known art as shown in FIGS. 5 and 6, a tip 102 is fixed by using a pin or lever, to the front end of a shank 101 of a cutting tool. FIG. 5 shows a cutting condition in which an outer peripheral surface of a rod-like work 103 is cut and FIG. 6 also shows a cutting condition in which an end surface of a disc-like work 103 is cut. In FIGS. 5 and 6, a letter N designates a rotating direction of the work 103 and a letter f designates a feeding direction of a cutting tool. In the use of a cutting tool of the type shown in FIG. 5 or 6, a work is cut by a nose portion 104 between a front edge and side edges of the tip 102, so that it was likely to damage or wear the nose portion 104, and moreover, in some cases, the tip 102 is disposed of without utilizing a portion of the tip other than the nose, thus being not economical. In addition, the nose portion 104 is designed to have a relatively small radius for preventing undesirable chatter vibrations at the cutting time. For this reason, when the feeding amount of the cutting tool increases, the surface of the work is roughly finished or machined and when the feeding amount decreases, the cutting efficiency is lowered. Generally, degree of finishing roughness $H_o$ of the work 103 is represented by the following equation, $$H_o = F^2/8r$$

where f is a feeding amount per one rotation of the work and r is radius of the nose portion.

Furthermore, in a case where the tip 102 is made of a material having high hardness such as cemented carbide, ceramics or cermet, a rake angle cannot be set to be large, so that the cutting condition is degraded and the cutting resistance increases thereby not to perform a fine cut-in operation. The increasing of the cutting resistance generates a high cutting heat which results in undesirable thermal expansion of the cutting tool or the work thereby not to attain a high working performance. In addition, in a case where the work is cut intermittently, the nose portion of the tip is likely damaged and many burrs are formed.

SUMMARY OF THE INVENTION

A main object of this invention is to eliminate defects or disadvantages of a conventional cutting tool and provide an improved oblique edged cutting tool provided with increased numbers of cutting edges and also provided with an easily detachable tip at the inclined front end thereof.

Another object of this invention is to provide an improved oblique edged cutting tool which can operate so as to obtain a fine machined surface of a work even when the tool is fed with a relatively high feed amount without substantially generating burrs, and which can also operate such that a tip detachably attached to the tool is less damaged in an intermittent cutting operation.

A further object of this invention is to provide an oblique edged cutting tool which is provided with a tip which is an indexable throw-away type tip having outer configuration radially symmetrical about its geometric center, the tip being detachably attached to the inclined front end of the tool so that the cutting edge of the tip is substantially parallel or normal to the surface of a work to be machined with a slight angle.

According to this invention, for achieving the above objects, there is provided an oblique edged cutting tool comprising a holder having a front end provided with an inclined surface, a flat tip to be detachably attached to the front end of the holder, the flat tip being of an indexable throw-away type having outer configuration radially symmetrical about the geometric center thereof, and means for detachably attaching the flat tip to the inclined surface of the front end of the holder, the flat tip being provided with a cutting edge on the outer peripheral surface thereof and the cutting edge being inclined by a predetermined angle with respect to the cutting relocity direction of the oblique cutting.

In one aspect of this invention, the flat tip has a straight cutting edge on the outer peripheral surface thereof and the tip is attached to the holder so that the upper and lower flat surface of the tip are substantially parallel or normal to the surface of a work to be machined.

Another aspect of this invention is that the flat tip is provided with a curved cutting edge on the outer peripheral surface thereof and the flat tip is attached to the holder so that a tangential line at the intermediate point of the curved cutting edge and a line normal to the cutting velocity direction of oblique cutting of the cutting tool constitute a predetermined angle and that the upper and lower surfaces of the flat tip are substantially parallel or normal to the surface of a work to be machined.

According to the oblique edged cutting tool of this invention, in one aspect, since an indexable throw-away type tip, such as standard tip based on ISO, can be used, the number of cutting edges are increased, and there is no need for using a specifically made tip. In another aspect, since the tip provided with a curved cutting edge is attached to the holder of the cutting tool with a relief angle with respect to a surface of a work to be machined, the fine machined surface is obtained even when the cutting operation is performed with a relatively high feed amount. In addition, since a considerably large effective rake angle exists, burrs or the like are less produced and an intermittent cutting operation can be effectively done.

DESCRIPTION OF THE PREFERRED EMBODIMENTS

Ahead of the disclosure of embodiments of this invention, will first be described the length of the cutting edge of an oblique edged tool contacting to a work with reference to FIG. 7.

Figure 4:
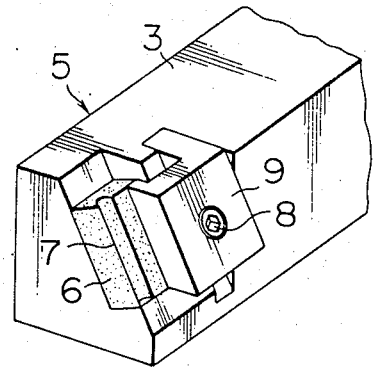
FIG. 4 is a perspective view showing another example of an oblique edged tool of a prior art.
Figure 7:
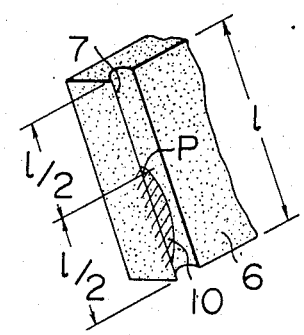
FIG. 7 is a perspective view showing a tip used for the cutting tool shown in FIG. 4 for showing a wear condition of the tip.

FIG. 7 shows a worn condition of the specifically made tip 6 attached to the oblique edged tool 5 shown in FIG. 4, and as is apparent from FIG. 7, when the tip 6 is set to the tool 5 in a manner that the intermediate point P of the oblique cutting edge 7 is located on the same level as the central axis of the work and cutting operation is carried out, it is observed that the cutting edge 7 is worn at the portion lower than the point P and almost not worn at the portion above the point P as viewed in FIG. 7. This fact will be deemed to require the reconsideration on the point that the specifically made tip having a cutting edge longer than that of the conventional indexable throw-away type standard tip has to be used for the oblique edged tool. Hereinafter, the term of "standard tip" means an indexable throw-away type standard tip which has an outer configuration radially symmetrical about its geometric center.

Next, consideration on the length of the cutting edge of the oblique edged tool contacting the work will be made geometrically hereunder in conjunction with FIGS. 8A through 8C and FIG. 9.

Figure 8A:
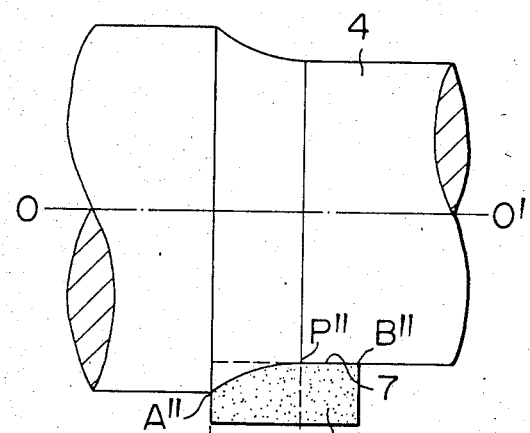
FIGS. 8A through 8C are schematic representations for explaining the relationship between a work to be machined and a cutting edge of an oblique cutting tool.
Figure 8B:
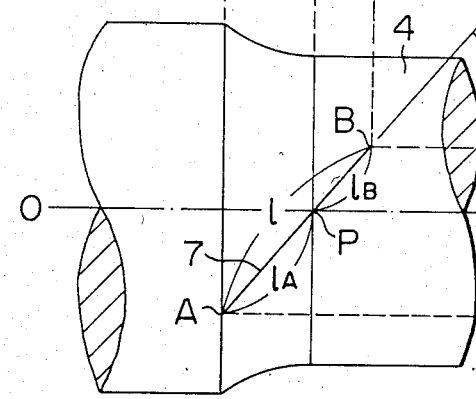
Figure 8C:
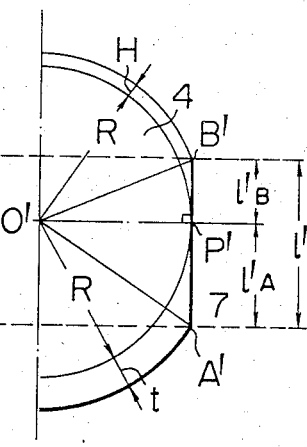
Figure 9:
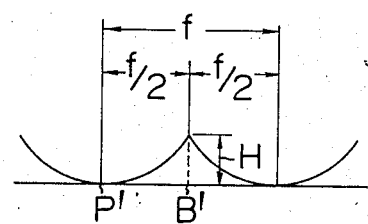
FIG. 9 is a view for showing the maximum height of the surface roughness of the machined work.

FIGS. 8A through 8C show the positional relationship between the cutting edge 7 of the oblique edged tool 1 and the work 4 to be machined, and in FIG. 8B, the cutting edge 7 inclined by an angle $\alpha$ with respect to the axis O–O' of the work 4 starts to contact the work 4 at the cutting start point A and the work 4 is finished to have a machined radius R when the cutting edge reaches the point P located on the level of the axis O–O' of the work 4. However, after passing the point P it will be observed that the machined surface of the work 4 provides wave shaped surface roughness. FIG. 9 shows the maximum height H of this surface roughness and the height H appears at the point B apart from the point P by a distance half (f/2) of the feeding amount f per one rotation of the work 4.

The maximum height H will be obtained by the following manner in consideration of the right-angled triangle O'B'P' formed as shown in FIG. 8C, in which $\overline{O'P'}=R$, $\overline{P'B'}=f/2 \tan\alpha$ and $<O'P'B'=90°$. Then the following equation is established.

$$R^2 + \left(\frac{f}{2}\tan\alpha\right)^2 = (R + H)^2 \quad (1)$$

-continued $$H \approx \left(\frac{f^2}{8R}\right) \tan^2\alpha$$

From the equation (1), it will be found that the roughness of the machined surface of the work is degraded as the feed amount f increases or the inclination α becomes large, whereas the surface roughness is improved as the radius R of the work 4 increases.

The length of the cutting edge 7 of the oblique edged tool contacting the work 4 will be considered hereunder.

Generally, in a case where a chip is continuously produced in a cutting operation of a circular work 4, it is observed that a thin chip having relatively wide width portions and relatively narrow width portions is flown out with twisted condition and fallen down along the oblique surface of the tip. The chip having relatively wide width portions is produced when the work is cut by the cutting edge $l_A$ below the point P of the cutting edge 7 as viewed in FIG. 8B and the chip having relatively narrow width portions is produced when the work is cut by the cutting edge $l_B$ above the point P.

The length $l_A$ of the cutting edge will be expressed as follows as shown in FIGS. 8B and 8C, in which depth of cut in the radial direction of the work 4 is designated by t, $$l_A = \frac{\sqrt{(R+t)^2 - R^2}}{\sin\alpha} \approx \frac{\sqrt{2RT}}{\sin\alpha} \quad (2)$$

While, the length $l_B$ of the cutting edge will be expressed as follows as shown in FIGS. 8B and 9, $$l_B = \frac{\left(\frac{f}{2}\right)}{\cos\alpha} \quad (3)$$

In an actual numerical example, for example, in which a circular work having diameter of 100 mm at feeding speed f of 0.5 mm/rev. by using an oblique edged tool inclined by angle α of 60° to obtain depth of cut of 0.1 mm, $$l_A = \frac{\sqrt{2 \times 50 \times 0.1}}{\sin 60°} = 3.651$$

$$l_B = \frac{\left(\frac{0.5}{2}\right)}{\cos 60°} = 0.5$$

$$l_B/l_A = \frac{0.5}{3.651} = 0.137$$

It will be understood from this example that the length $l_B$ of the cutting edge above the point P is merely 0.5 mm, being 1/7 of the length $l_A$ and the entire length $l=(l_A+l_B)$ of the cutting edge is 4.151 mm, which shows the fact that a standard square tip having one side of 4.762 mm or a standard triangular tip having radius of an inscribed circle of 3.969 mm can effectively be utilized as a cutting tip for an oblique edged tool for this invention.

The following table shows the maximum diameters of works which can be machined by standard tips having various sides and the maximum allowable cut depths when a work having diameter of 100 mm is cut by the various sized standard tips of the indexable throw-away type.

TABLE 1

| Shape of Standard Tip (ISO) | Length of One Edge of Standard Tip (Radius of Inscribed Circle) | Maximum Diameter of Work to Be Machined with Feed Amount of 0.5 mm/rev. and Depth of Cut of 0.2 mm | Allowable Depth of Cut When Work with Diameter of 100 mm Is Cut (Unit mm) |
| --- | --- | --- | --- |
| Equilateral Triangular Tip | 6.875 (3.969) | 152.402 | 0.305 |
| | 8.248 (4.762) | 225.118 | 0.450 |
| | 9.623 (5.556) | 312.109 | 0.624 |
| | 10.999 (6.350) | 413.359 | 0.827 |
| | 13.749 (7.938) | 658.260 | 1.317 |
| | 16.498 (9.525) | 959.760 | 1.920 |
| | 21.997 (12.700) | 1,653.120 | 3.466 |
| | 27.496 (15.875) | 2,732.940 | 5.466 |
| | 32.966 (19.050) | 3,959.963 | 7.920 |
| Equilateral Square Tip | 3.969 | 45.127 | 0.090 |
| | 4.762 | 68.117 | 0.136 |
| | 5.556 | 95.862 | 0.192 |
| | 6.350 | 128.334 | 0.257 |
| | 7.938 | 207.464 | 0.415 |
| | 9.525 | 305.440 | 0.611 |
| | 12.700 | 558.150 | 1.116 |
| | 19.050 | 1,290.384 | 2.581 |
| | 25.400 | 2,325.038 | 4.650 |

Note 1: The length l of one edge of the tip is a value when it is supposed that the radius of the nose of the tip is zero.
Note 2: The maximum diameter of the work is obtained on the basis of 3.75 (l − 0.5)².
Note 3: The allowable depth of cut is obtained on the basis of 0.0075 (l − 0.5)².

Figure 10:
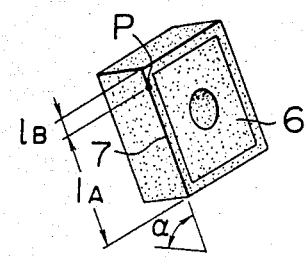
FIG. 10 is a perspective view showing a tip illustrated for explaining the length of the cutting edge of the tip.

It will also be understood from the foregoing description that the vertical intermediate point of the cutting edge of the inclined tip does not accord with the level of a plane including the axis of the work, and otherwise, a point P near the upper end of the cutting edge is located so as to accord with the level of the axis of the work and to have a length of approximately $l_B$ or slightly more between the point P and the upper end of the cutting edge 7 of the tip 6 as shown in FIG. 10, whereby a tip having a cutting edge length of about half of that of the conventional specifically made tip can be availably utilized.

Figure 11:
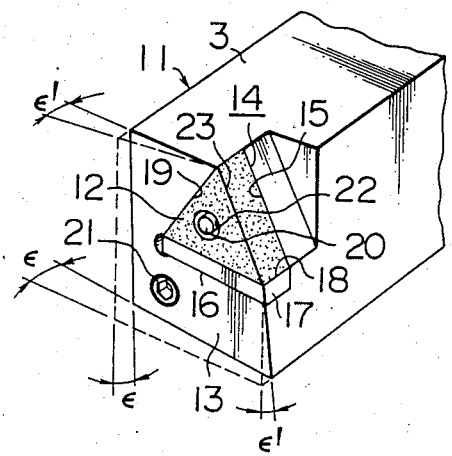
FIG. 11 is a perspective view showing an embodiment of an oblique edged tool according to this invention.
Figure 12:
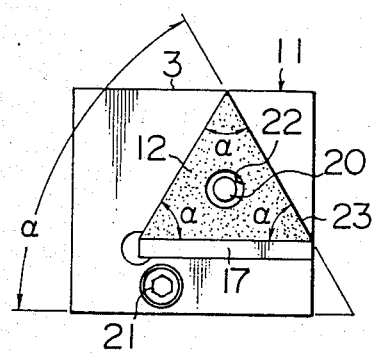
FIG. 12 shows an end view of the tool shown in FIG. 11.

FIG. 11 and 12 represent one embodiment according to this invention, in which a triangular tip 12 of an indexable throw-away type standard tip is fitted to the front end of a holder or shank 3 of rectangular cubic shape of an oblique edged tool 11. The front end of the holder 3 does not exist in a plane shown by broken lines in FIG. 11, and actually, the front end 13 thereof is inclined as shown by solid lines towards the tangential direction from a tip mount position 14 of the holder 3 so that the flank surface of the tip 12 does not contact the work to be machined. The relief angle of the surface 13 is predetermined to be approximately 10°. Accordingly, as shown in FIG. 11, the relief angles $\epsilon$, $\epsilon'$ are provided for the respective sides of the holder 3. The tip mount portion 14 is formed between the inclined front surface 13 and a rear surface 15 parallel thereto at the corner portion of the holder 3. On a flat and horizontal base 16 of the tip mount portion 14 is located a shim 17 made of super hard alloy or hardened steel. The upper surface 18 of the shim 17 and the oblique surface 19 of the tip mount portion 14 are respectively normal to the rear surface 15. The tip mount portion 14 thus defined by these surfaces can significantly accord with the outer configuration of the triangular tip 12 to be used.

A swingable pin 20 is projected from the rear surface 15 of the tip mount portion 14 for supporting the tip 12 and the pin 20 is swung in directions apart from or approaching a bolt 21 fixed to the front end surface 13 of the holder 3 by rotating the bolt 21.

When it is required to mount the standard triangular tip 12 on the tip mount portion 14, the tip 12 is first positioned on the tip mount portion 14 so that the central hole 22 of the triangular tip 12 is fitted by the pin 20 and the bolt 21 is rotated so that the front end of the pin 20 is inclined towards the bolt 21 thereby to press the tip 12 against the oblique surface 19 of the tip mount portion 14 and the shim 17.

Although the inclination angle $\alpha$ of the cutting edge of the tip 12 is generally selected from the range of 30° ~70° with respect to the horizontal surface, it was found in our experiment that the cutting operation of the cutting edge of the tip 12 with the inclination of approximately 60° can be availably performed in view of the cutting resistance, vibrations or the like. Accordingly, since the triangular tip 12 is positioned as shown in FIGS. 11 and 12 and has the equilateral shape, the inclination $\alpha$ of the cutting edge 23, in FIG. 12, is 60°, thus being available.

In addition, since the relief angle is provided at the front end of the holder 3 and the shim 17, the pin 20 and the bolt 21 are located so that the front ends thereof are not projected beyond the front surface 13 of the holder 3, only the cutting edge 23 of the triangular tip 12 contacts the work surface. Moreover, the tip 12 can positively be supported by the pin 20, and the main component of the cutting resisting force acting on the cutting edge 23 during the cutting operation acts downwardly, but the tip 12 can be safely maintained by the existence of the shim 17 having relatively large strength between the base of the tip mount portion 14 and the lower surface of the tip 12. Furthermore, since the triangular tip 12 has an outer configuration radially symmetrical about its geometric center and is provided with six long edges having the same length, these edges can be used alternately as a cutting edge when one of these edges has been worn.

In one example, when the triangular tip 12 having a radius of the inscribed circle of 12.7 mm which is widely used in this industrial field is used, one side length of the triangular tip 12 is approximately 22 mm in no consideration of slightly round noses, and supposing that the cutting operation is performed at the feed amount f of 0.5 mm/rev. with a triangular tip having an inclination of 60° to obtain a depth of cut t of 0.2 mm, a work having a diameter of approximately 1653 mm can be cut by the calculation in accordance with the equation (2) and equation (3). Since the use of a work having a diameter more than 1653 mm is very rare case, this standard triangular tip widely used can be availably utilized for almost all cutting operation.

In addition, in a conventional cutting operation, the corner portions of the tip wear, but with the tip of the embodiment of this invention, the longitudinal intermediate edge portion can be utilized for the cutting operation, so that the tip once used for the conventional tool can be reused, or reversely, the tip once used for the oblique edged tool of this invention can also be reused for the conventional cutting tool in which the nose portion of the tip is utilized for cutting the work.

Figure 13:
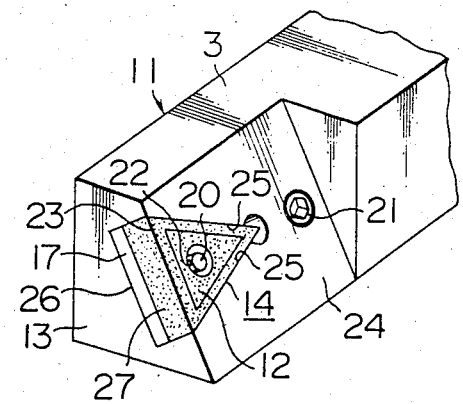
FIGS. 13 through 16 are perspective views showing other embodiments or modifications of the oblique edged tools according to this invention, respectively.

FIG. 13 shows another embodiment of the use of the tip in which the triangular tip 12 used for the example shown in FIG. 11 or 12 is positioned on the tip mount portion 14 in a positional relationship different from that shown in FIG. 11. Referring to FIG. 13, the tip mount portion 14 is formed at the front end portion of the inclined surface 24 formed at the front end of the holder 3. The surface 24 is inclined by an angle of 60° with respect to the horizontal surface and the side surfaces 25 of the tip mount portion 14 intersect with each other with an angle of 60° therebetween. The shim 17 is located on the base surface 26 of the tip mount portion 14, from which the pin 20 projects to be swingable by the bolt 21 as described in connection with the example shown in FIG. 12. The cutting edge 23 of the tip 12 is aligned with the front surface 13 of the holder 3.

According to the arrangement of the tip 12 described above, a breaker 27 having a positive rake angle serves effectively for the cutting operation and improves the cut condition thereby to reduce the cutting resistance as well as the production of burrs.

Figure 14:
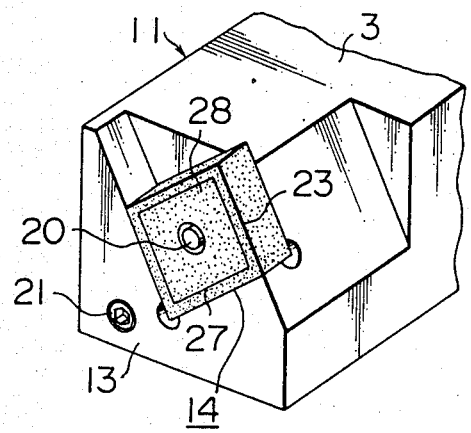

FIG. 14 shows a perspective view of another example according to this invention, in which a standard equilateral square tip 28 is fitted to the holder 3 in the vertical state by the manner substantially identical to that shown in FIG. 11. The equilateral square tip 28 is provided with eight cutting edges 23, more edges thus being available in comparison with the equilateral triangular tip.

Figure 15:
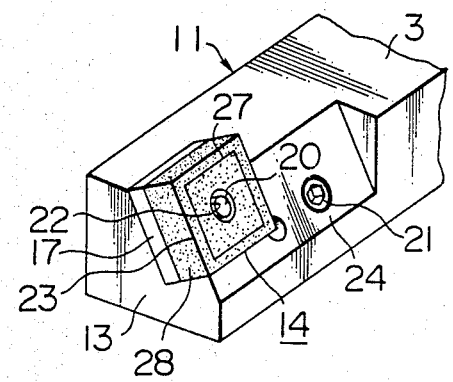

FIG. 15 shows a perspective view in which the equilateral square tip 28 is located by the manner substantially identical to that mentioned in connection with the equilateral triangular tip as shown in FIG. 13, and in this example, the braker of the tip 28 serves effectively for the cutting operation.

Figure 16:
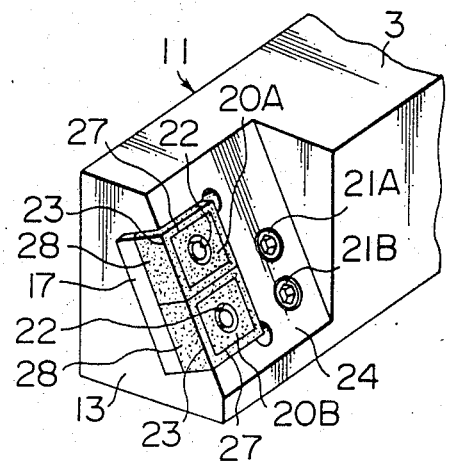
Figure 17:
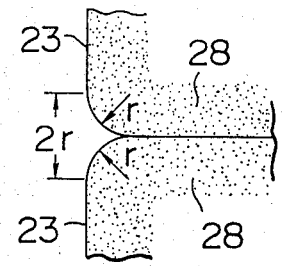
FIGS. 17 through 19 are representations for explaining a gap between tips when the tips are disposed as shown in FIG. 16.

FIG. 16 shows one modification of the example shown in FIG. 15, in which two pins 20A and 20B located with space on the tip mount portion so as to project obliquely upwardly therefrom and the bolts 21A and 21B are also located to the inclined surface 24 on positions corresponding to the pins 20A and 20B, respectively. In an actual attachment of the equilateral square tips 28, 28, two tips are fitted side by side so that the pins 20A and 20B are fitted into the central holes 22, 22 of the tips 28, 28 and the cutting edges of both tips are aligned thereby to provide a relatively long cutting edge to cut the work having a large diameter.

Figure 19:
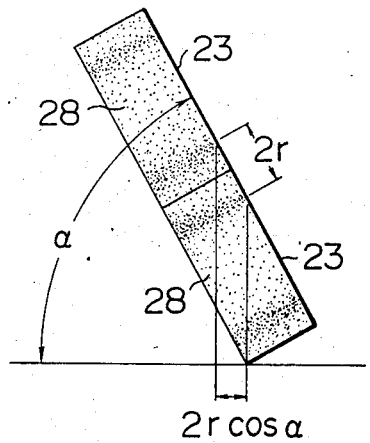
Figure 18:
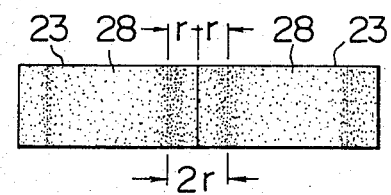

With the embodiment shown in FIG. 16, a gap having a width of 2r may be formed because the tip 28 has a round nose portion having a radius r at the corner portion thereof, so that when the work is machined by this type cutting tool, non-machined portions are linearly formed on the surface of the work. Each of the non-machined lines has a width 2r when the tips are not inclined as shown in FIG. 18, whereas the line has a width r when the tips are inclined by an angle of 60°, for example shown in FIG. 19. It may be of course possible to arrange three of more equilateral triangular or square tips in the oblique manner as occasion demands.

According to this invention, the oblique edged cutting tool provided with a tip of an indexable throwaway type has an outer configuration radially symmetrical about its geometric center, so that the cutting edges are increased without a specifically manufactured tip, and moreover, standard tips such as made in accordance with ISO can be utilized.

In the foregoing description, reference is made to an oblique edged cutting tool provided with a standard tip having straight cutting edges and being of an indexable throw-away type, but this invention is not limited to the standard tip of this type and the other tips each having an outer configuration radially symmetrical about its geometric center can be applied.

Moreover, as described in detail hereinafter, there can be used, for the oblique edged cutting tool, a tip having curved cutting edges and having a substantially equilateral or circular outer configuration radially symmetrical about its geometric center.

Figure 20:
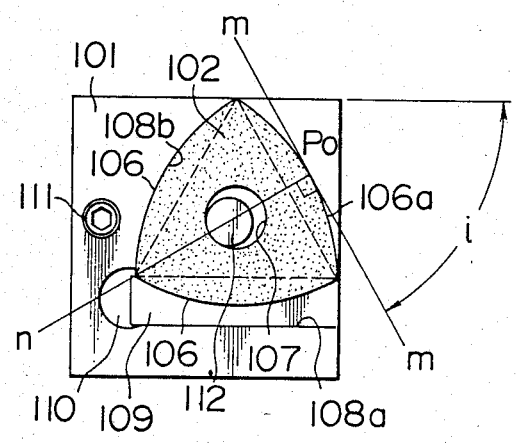
FIG. 20 is a front view showing a further embodiment of an oblique edged tool according to this invention.
Figure 21:
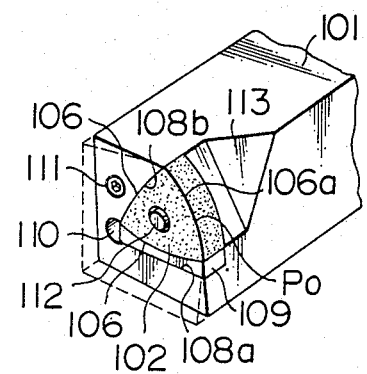
FIG. 21 is a perspective view showing the oblique edged tool shown in FIG. 20.
Figure 22A:
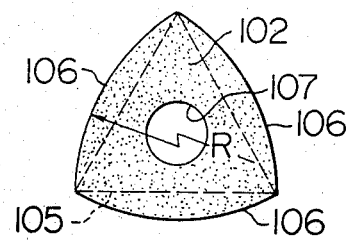
FIGS. 22A and 22B are plan and front views of the tip attached to the tool shown in FIG. 20 or 21.
Figure 22B:
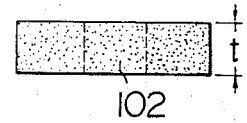

FIGS. 20 through 22 show a tip 102 having an outer configuration of substantially equilateral triangular shape and an oblique edged cutting tool to which the tip of this shape is attached. As shown in FIGS. 22A and 22B, the tip 102 has slightly curved cutting edges 106 and a thickness t, and the cutting edge 106 is shown by an arc of a circle having a radius R. An attachment hole 107 is provided for the central portion of the tip 102.

As shown in FIGS. 20 and 21, the tip 102 is fitted in a notch recess 108 and a shim 109 is interposed between the tip 102 and the bottom 108a of the notch recess 108. An escape hole 110 is formed at the boundary portion between the bottom and side surfaces 108a and 108b of the recess 108. The tip 102 is secured to or removed from the shank or holder 101 of the tool by rotating a clamp bolt 111 to permit a pin or lever 112 inserted into an attachment hole 107 to take a locking or unlocking position, and under the secured condition only the cutting edge portion 106a located most outside of the cutting edge 106 of the tip is utilized for cutting the work.

Figure 24:
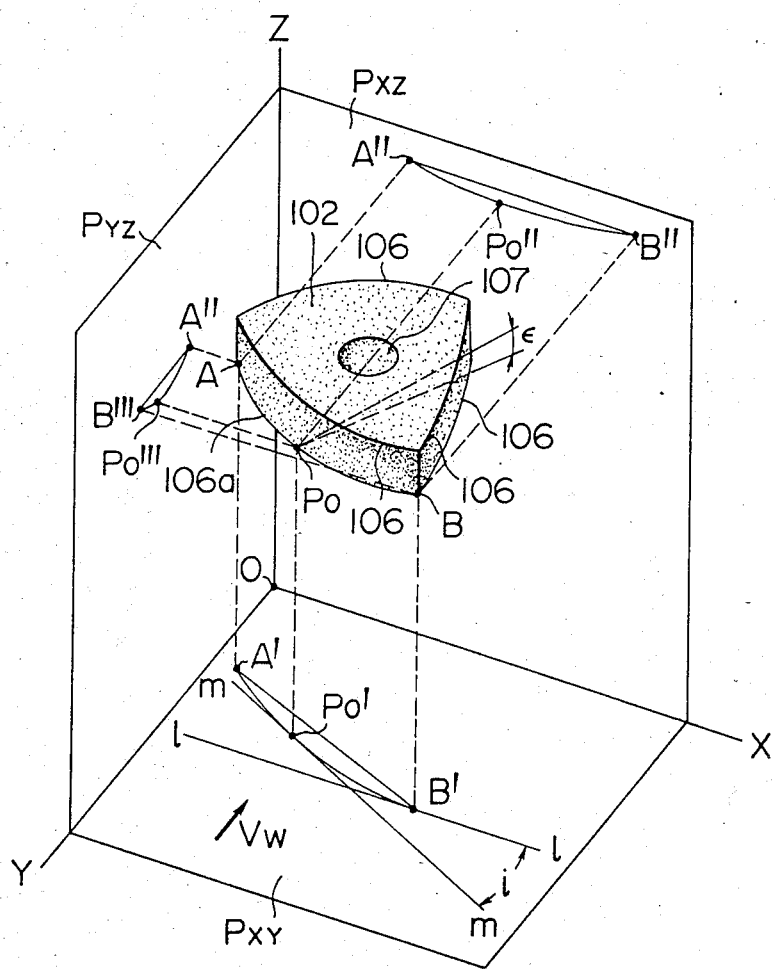
FIG. 24 is a view for explaining the tip under the cutting condition projected on the three dimensional planes.

An inclination i of a tangential line m at substantially intermediate point $P_o$ of the cutting edge portion 106a is an angel defined by the tangential line m and a line l normal to the cutting direction $V_w$, as shown in FIG. 24, and the angle i is usually set to a value between 30° and 70°. In the embodiment illustrated in FIG. 20, since substantially the equilateral triangular tip 102 is used at the vertically secured state, the angle i is set to 60°, and as is apparent from FIG. 21, a tip take-out pocket 113 is formed at a portion of the shank 101 behind the cutting edge 106a.

The cutting edge 106a is provided with an end relief angle ε (FIG. 11) and as shown in FIG. 20 or 21, when the end relief angle ε is set along a perpendicular line n normal to the tangential line m passing the intermediate point $P_o$ of the cutting edge 106a having a radius R of curvature, the point $P_o$ projects towards the most forward portion of the shank 101 thereby to have a large depth of cut. The angle ε is often set to a value within the range of 3°∼11°. The break lines written in front of the shank end shown in FIG. 21 show an imaged surface normal to the longitudinal axial line fo the shank 101 and as is apparent from this imaged surface, the actual front end surface of the shank 101 is somewhat inclined because of the existence of the end relief angle ε.

Figure 23:
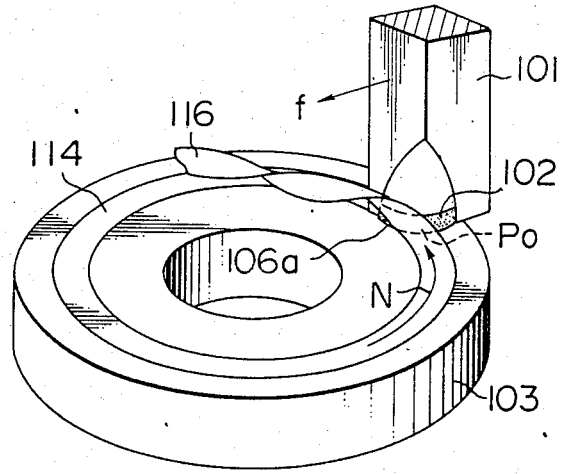
FIG. 23 is a perspective view showing the work cutting condition in use of the oblique edged tool shown in FIG. 20 or 21.

FIG. 23 is a perspective view of one example of the cutting condition of the cutting tool according to this invention in which the end surface 114 of a circular work 103 is subjected to the cutting operation by a machine tool such as a vertical lathe. In this example, the shank 101 is positioned so that the longitudinal axis of the shank 101 is substantially normal to the end surface 114 of the work 103 and the point $P_o$ and portions near the point $P_o$ of the curved cutting edge 106a of the tip 102 are entered into the work 103.

FIG. 24 shows a projected condition of the cutting edge 106a of the tip 102 in the cutting operation into three planes $P_{xy}$, $P_{xz}$ and $P_{yz}$, respectively normal to each other in a cubic space.

In FIG. 24, since the cutting edge 106a of the tip 102 is approximately parallel to the cutting surface, but with the end relief angle ε, parallel to the plane $P_{xy}$, the actual cutting edge portion 106a of the cutting edge 106 performs a cutting operation with a large curved cutting edge, so that the maximum value Ho of the roughness of the machined surface of the work is extremely small and the surface thus machined is substantially plane even if the feed amount of the tip is large.

Figure 25:
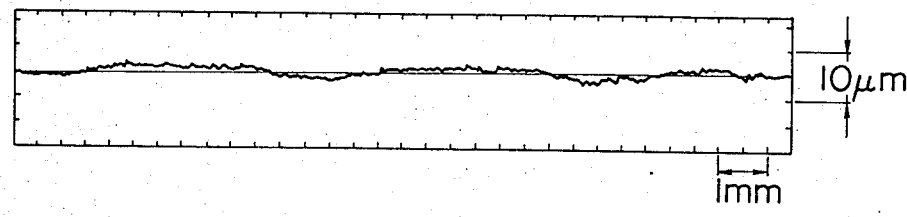
FIG. 25 shows a graph representing surface roughness in an enlarged scale of a machined work.

FIG. 25 shows a curve representing the roughness of the machined surface of the work which is cut in accordance with cutting conditions shown in the following Table 2 by using a cutting tool according to this invention.

TABLE 2

| Items | Cutting Conditions |
| --- | --- |
| Substance of work to be machined | Stainless steel (13 chromium, 4.5 nickel alloy) |
| Machine tool | Extension boring and turning mill |
| Cutting speed | 120 m/min. |
| Feed amount | 5.2 mm/rev. |
| Cutting depth | 0.03 mm |
| cutting condition | Intermittent cutting |

As is apparent from the measured result shown in FIG. 25, it was found that an approximately maximum roughness 3.2 μm of the machined surface could be obtained with the feed amount 5.2 mm/rev. in the intermittent cutting operation of a stainless steel work.

In FIG. 24, when it is supposed that the cutting edge 106a is projected on the plane $P_{xy}$, the inclination between the tangential line m at the point $P_o$ which is substantially the intermediate portion of both ends A and B of the cutting edge 106a and a line l normal to the cutting direction $V_w$ forms an angle i, and a shpae of the cutting edge 106a projected on the plane $P_{xy}$ exhibits a mount shape facing the cutting direction $V_w$ with the center being the intermediate point $P_o$ of the cutting edge 106a.

As shown in FIG. 23, in a case where the cutting tool is fed in the tool feeding direction f normal to the cutting direction $V_w$, the cutting edge 106a has a projected mount-shape with the center being the intermediate point $P_o$ with respect to the feeding direction f.

A projected image of the cutting edge 106a on the plane $P_{xz}$ exhibits a mount-shape curved line with respect to an entering direction (downward direction as viewed in the drawing) and the projected image on the plane $P_{yz}$ also exhibits a mount-shape curved line with respect to the entering direction. The fact that the cutting edge 106a provided with the inclination angle i acts as the cutting edge having a mount-shape curved lines in the respective directions means that the strength of the cutting edge can be improved in comparison with a case where the cutting edge acts as a cutting edge having a straight line and that the cutting edge is gradually contacted with the work thereby to gradually increase the cutting amount and to gradually decrease the cutting amount after the cutting amount becomes maximum, whereby a fine machined surface is exhibited. It will also be found that the cut chip has a cross section having thin thickness at both ends thereof.

In consideration of a cutting temperature of the work due to the color change of the chip of a soft steel, it will be found that both ends C and D of the chip exhibit a pale silver-white color representing a relatively low cutting temperature and the central portion thereof exhibits a dark blue color representing a relatively high temperature. The fact that the temperature of one end of the chip in contact with the machined suface of the work 103 is relatively low means that the machined surface is less affected by the thermal deformation or thermal damage.

Figure 26:
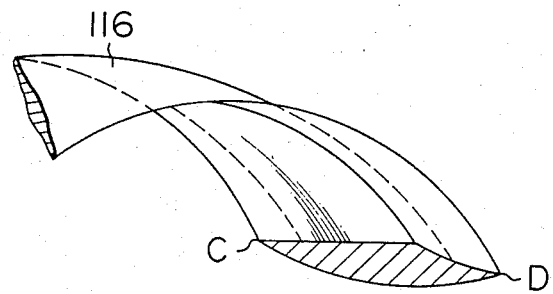
FIG. 26 shows a shape of a part of a chip produced by the cutting operation.
Figure 27:
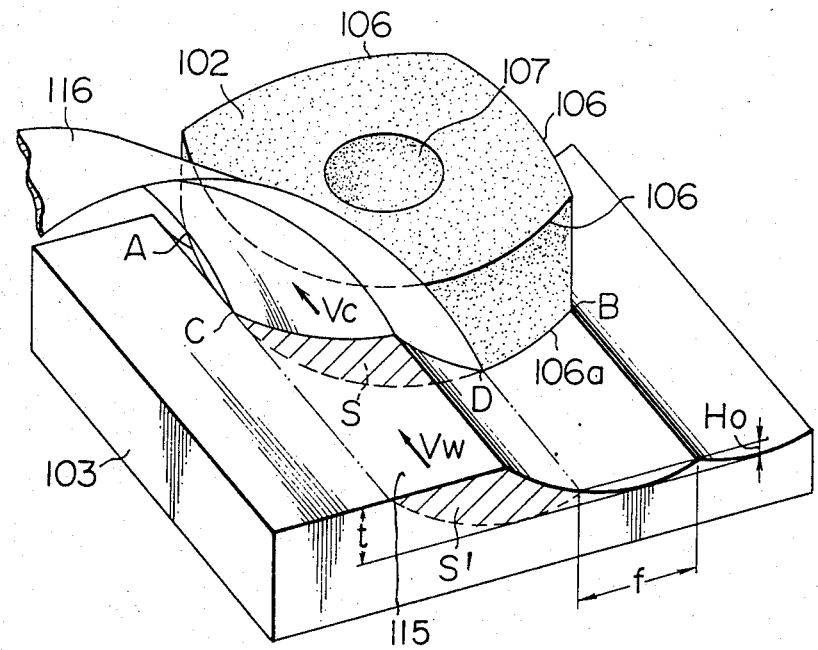
FIG. 27 is a perspective view showing the tip in the cutting operation with the chip produced.

FIG. 27 shows a perspective view in an enlarged scale of the tip 102 in the cutting operation, in which the cutting edge 106a having a large radius of curvature R has an attitude in which the flat surface of the tip 102 is fallen to a position approximately parallel to the cutting surface 115 with the relief angle $\epsilon$, so that the cutting edge 106a can perform a cutting operation with a large radius of curvature, whereby the maximum value $H_o$ of the roughness of the machined surface of the work becomes extremely small even if the feed amount f is increased. A cut section s of a portion to be cut and a projected image s' of that portion on the X-Z plane have shapes respectively shown in FIG. 27 and the cross sectional shape of the chip 116 has a central portion having relatively thick thickness and end portions having relatively thin thickness as shown in FIG. 26. This fact means that the curved cutting edge 106a gradually enters in the work 103 to produce the machined surface gradually. The surface of the work advancing towards the curved cutting edge 106a at the cutting speed $V_w$ is cut by the cutting edge 106a and the chip 116 is flown out at a speed $V_c$. The chip 116 is flown out in a direction which is a function of the inclination i of the cutting edge 106a. The chip flow-out angle is designated $\eta c$ hereinbelow. The chip 116 is as a whole flown out in an inclined direction of the cutting edge 106a with a twisted condition.

Figure 28:
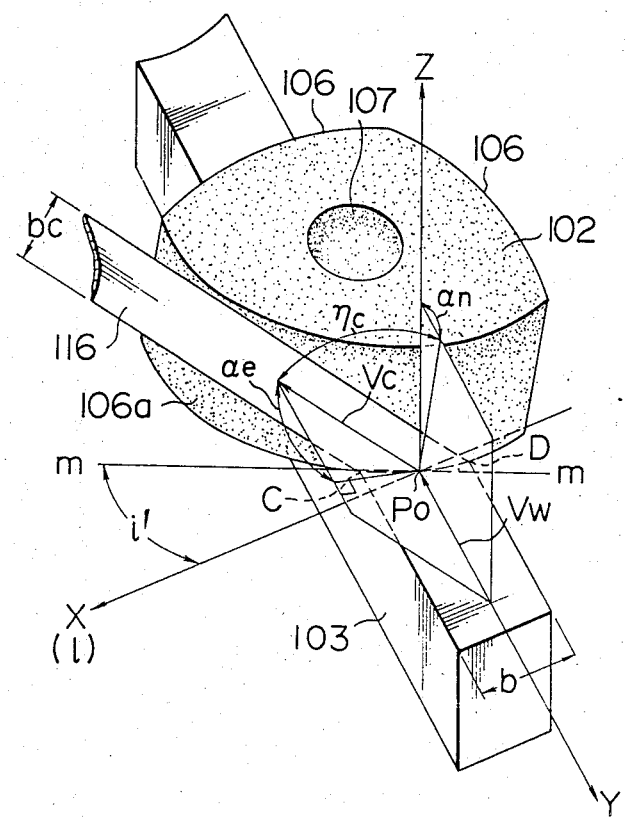
FIG. 28 is a modeled perspective view for explaining relationships between various angles and cutting directions of the cutting tip and the chip in the cutting operation.

FIG. 28 shows a view for explaining relationships between respective angles and speeds of the chip 116 and the curved cutting edge 106a, and in FIG. 28, the feed amount f shown in FIG. 23 or 27 is eliminated for the clarification of the explanation and the width of the work is narrowed less than the width of the cutting edge 106a. In addition, the chip 116 is linearly flown out without twisting for clearly showing the chip flow-out direction. In FIG. 28, a symbol $V_w$ designates a cut speed of the work 103, $V_c$ is a flow-out speed of the chip 116, $\alpha_n$ is a normal rake angle, $\alpha_e$ is an effective rake angle, and $\eta_c$ is a chip flow-out angle.

In general, when the cutting edge 106a is inclined by an angle i with respect to the direction normal to the cutting direction, the chip flow-out angle $\eta c$ is an angle constituted by a plane normal to the cutting edge 106a and the chip flow-out direction and measured on the rake surface of the chip 116, and the following equation is established from a geometrical view point.

$$\sin\alpha_e = \sin\eta c \cdot \sin i + \cos\eta c \cdot \cos i \cdot \sin\alpha_n \quad (4)$$

In the equation (4), the normal rake angle $\alpha_n$ is a rake angle in a plane normal to the cutting edge and the machined surface of the work and is set at the designing time of the cutting tool, and accordingly, the normal rake angle $\alpha_n$ is easily measured. The effective rake angle $\alpha_e$ is a rake angle in a plane including the cut speed $V_w$ and the chip flow-out speed $V_c$ and is the most important rake angle for a cutting mechanism. With the equation (4), it will be found that the effective rake angle $\alpha_e$ can be calculated when the chip flow-out angle $\eta_c$ is obtained. The angle $\eta c$ will be obtained as an approximate value by applying measured values of the width b of the work 103 being equal to the width of the cut width and the width $b_c$ of the chip 116 into the following equation (5).

$$\cos\eta c = b_c \cos i / b \quad (5)$$

In an actual measurement of the chip width, the cut width and the normal rake angle and calculation of the chip flow-out angle, it was found that when the inclination i at the point $P_o$ of the cutting edge 106a is 60° and the normal rake angle $\alpha_n$ is $-10°$, the chip flow-out angle $\eta c$ is about 50° and the effective rake angle $\alpha_e$ representing a cutting performance or cut condition is about 40°. This result means that even if the cutting tool is itself not provided with a sufficient large rake angle, a cutting operation can be performed with a high cutting performance by inclining the cutting edge.

Figure 29:
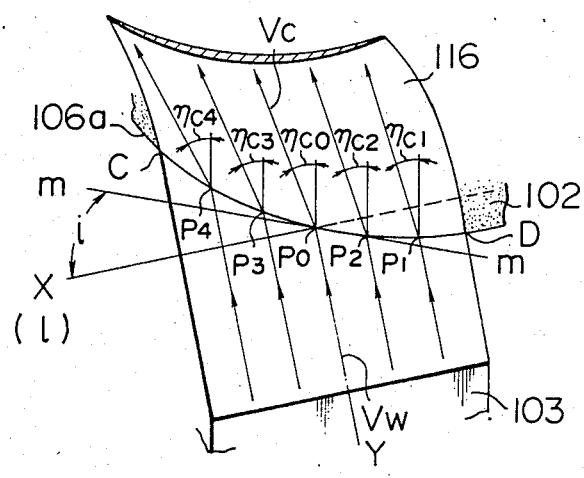
FIG. 29 is an enlarged schematic view of the part of the chip for explaining the flow-out angle of the chip.

Although FIG. 28 is utilized for explaining the cutting mechanism or principle on the point P of the inclined cutting edge 106a, FIG. 29 shows a perspective view of a part of the chip 116 for explaining chip flow-out angles $\eta c_0$, $\eta c_1$, $\eta c_2$, $\eta c_3$ and $\eta c_4$ on points $P_0$, $P_1$, $P_2$, $P_3$ and $P_4$ of the cutting edge 106a, respectively, and it will be found that the flow-out angles on the respective points are significantly different from each other on the basis of the difference between the inclined angle represented by the inclination of the tangential line and the rake angle at each point. For the reason mentioned above, a strain inside the chip 116 is dispersed to likely expand the width thereof, and the configuration of the cutting edge is transferred to the chip, so that the cross section of the chip is curved and strengthened. Accordingly, since the chip is smoothly flown out as a whole in the inclining direction of the cutting edge 106a, the chip 116 is not twined round the cutting edge 106a or does not adhere thereto, thus significantly restricting wear of a tool resulting from the chip adhesion to the cutting edge and improving the durability of the tool in comparison with cutting tools of conventional type.

Figure 1:
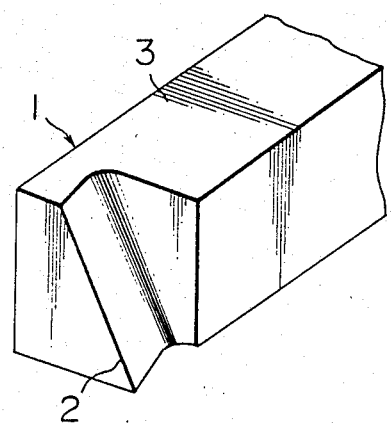
FIG. 1 is a perspective view showing one example of an oblique edged tool of a prior art.
Figure 2:
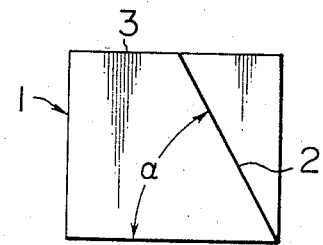
FIG. 2 shows an end view of the tool shown in FIG. 1.
Figure 3:
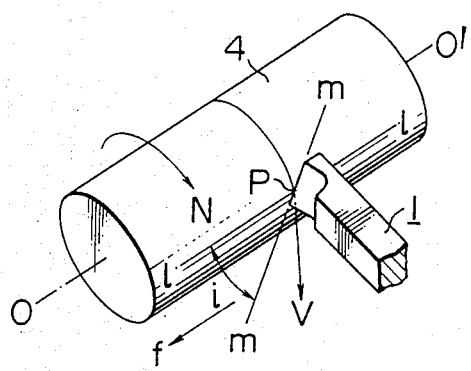
FIG. 3 is a perspective view showing a cutting operation condition in use of the oblique edged tool shown in FIG. 1.
Figure 30:
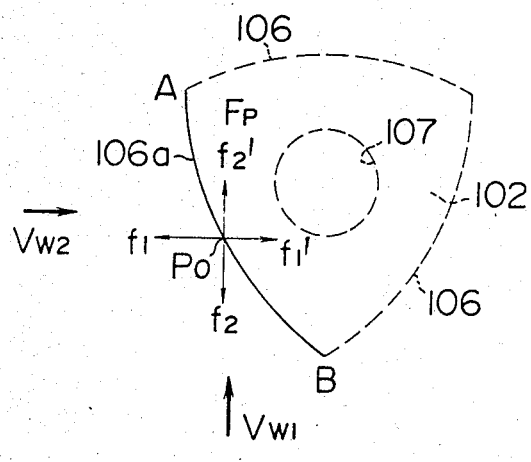
FIG. 30 is a view of the cutting tip for explaining the cutting velocity direction of the work and feeding direction of the tool.

FIG. 3 is a view for explaining the relationship between the cutting direction and the feeding direction of the tip 102 on the point Po of the cutting edge 106a thereof, and in this figure, only the projected cutting edge 106a is shown by a solid line. In FIG. 30, in a case where the cutting direction is represented by the arrow $V_{w1}$, the feeding direction will be chosen to the direction $f_1$ or $f'_1$, while represented by the arrow $V_{w2}$, the feeding direction will be chosen to the direction $f_2$ or $f'_2$, thus being convenient for the practical use of the cutting tool.

The main component of cutting resisting force acting on the cutting edge 106a acts in the same direction as the cutting direction, so that the acting direction of the main component of force $F_p$ when the cutting direction is $V_{w1}$ substantially accords with the direction $f'_2$.

Figure 5:
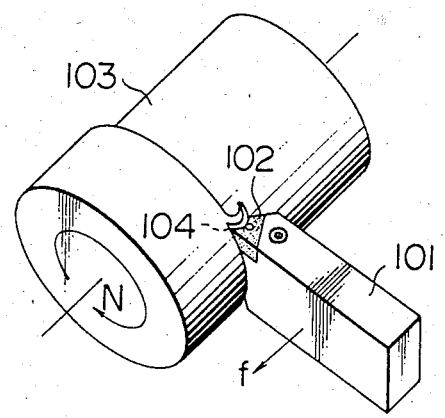
FIGS. 5 and 6 are also perspective views showing work cutting operation conditions in use of a cutting tool provided with a cutting tip of a prior art, respectively.
Figure 6:
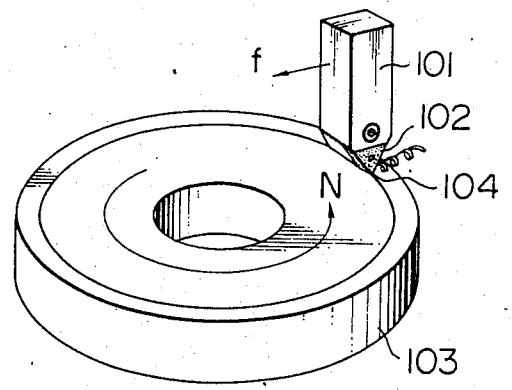

With a conventional cutting tool, since the main component of the cutting resisting force is applied to a thin thickness portion of a flat tip 102 as shown in FIG. 5 or 6, the tip 102 is liable to be damaged, but according to the cutting tool of this invention, the main component of force $F_p$ is applied in a large sized direction of the flat tip 102 as shown in FIG. 30, so that the strength of the tip increases.

According to the embodiment of this invention described above, in which a flat tip provided with a peripheral curved cutting edge having a radius of large curvature is inclined to a position substantially parallel to the surface of a work to be machined with only a relief angle $\epsilon$ therebetween and the cutting edge of the tip is also inclined with respect to the cutting and feeding direction, such advantages or effects as summarized as follows will be expected.

(1) Since the cutting edge utilized directly for the cutting operation is constructed as a curved cutting edge having a radius of large curvature with respect to the cutting edge entrance direction, a good cut surface roughness can be obtained even when the cutting edge is fed at a relatively large feeding speed.

(2) Since the cutting edge performs the cutting operation as a cutting edge having a radius of large curvature and inclined with respect to the cutting and feeding directions, there are obtained a relatively large effective rake angle and an improved cutting performance, and in addition, burrs or the like are less formed and extremely fine entering operation can be performed. Moreover, the work is gradually cut, so that the cutting impact is not applied at one time thereby to prevent the cutting edge from damaging as well as to effectively suppress undesirable chatter vibrations.

(3) Since a cut chip has a curved cut cross section, the chip is smoothly flow out as a whole in an inclined direction of the cutting edge, whereby the cut chip does not adhere to the cutting edge thereby to improve the durability against wear of the cutting edge.

(4) Since the cutting and feeding directions can optionally be selected with the attitude of the cutting edge maintained, the cutting operation can be performed with high efficiency. In addition, the cutting direction is variable in a range of angles of from 0° to 90° and an opposing feeding direction can be selected as the feeding direction.

(5) Since the curved cutting edge portion of the tip can be utilized for the actual cutting portion, the tip can be reused after the curved cutting edge has been worn as a conventional tip which utilizes the corner edge portions thereof as cutting edges, thus being economical. In addition, since the tip of this invention has a radius of considerably large curvature, the tip can be attached with no problem to a cutting tool of conventional type.

Figure 31:
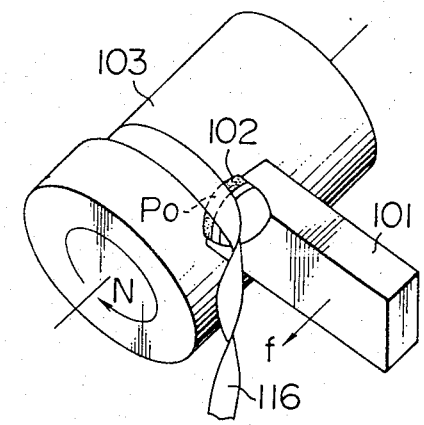
FIG. 31 is a perspective view of the cutting tool which cuts the outer peripheral surface of a cylindrical work.
Figure 32:
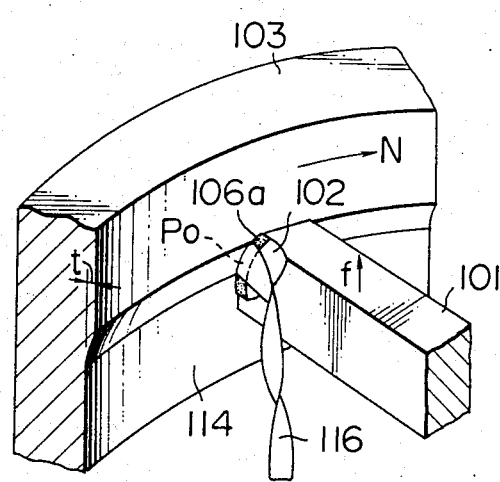
FIG. 32 is also a perspective view of the cutting tool which cuts the inner peripheral surface of a ringshaped work.

(6) The cutting tool of this invention can be utilized for an outer peripheral surface machining (FIG. 31) and an inner peripheral surface machining (FIG. 32) as well as an end surface machining (FIG. 23).

(7) Since the tip according to this invention can be attached to the cutting tool so as to exhibit its most large size with respect to the direction of the main component of the cutting resisting force corresponding to the cutting direction, the strength of the cutting edge is improved and the durability thereof can be expanded, as well as the application to the intermittent cutting operation or difficult cutting operations of hard materials with large impacts or vibrations. In addition, because of the cutting edge being curved in various directions, the strength thereof is improved in comparison with the straight cutting edge thereby reducing wear and damage.

FIGS. 33 through 44 show the other embodiments according to this invention, in which like reference numerals are added to elements or parts corresponding to those shown in FIGS. 5 and 6 and FIGS. 20 through 32.

Figure 33A:
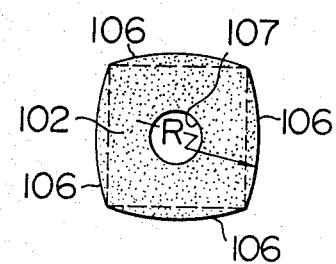
FIGS. 33A and 33B are plan and front views of an equilateral square tip used for the oblique edged tool according to this invention.
Figure 33B:
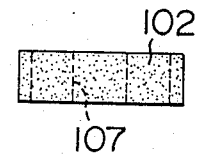

FIGS. 33A and 33B show respectively a plan and side views of a substantially equilateral square tip 102 having four sides as cutting edges 106 each outwardly protruding in mount shape.

Figure 34:
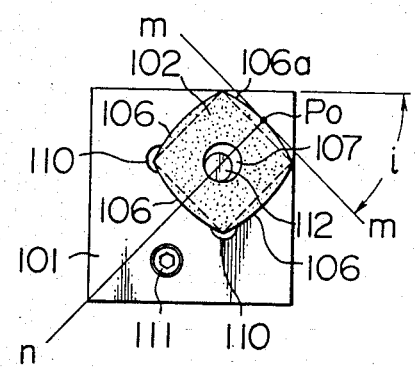
FIG. 34 is a front view showing the oblique edged tool in which the equilateral square tip shown in FIG. 33 is vertically attached.

FIG. 34 shows a front view in which the square tip 102 is detachably fitted to the front end of the shank 101 of a cutting tool with a standing condition having one corner directed downwardly. In this embodiment, although the inclination i is defined to 45°, it is not necessary to limit this angle as described with respect to the foregoing embodiment.

Figure 35:
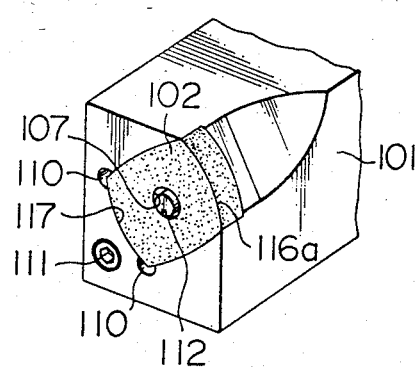
FIG. 35 is a perspective view showing the oblique edged tool shown in FIG. 34.

FIG. 35 is a partial perspective view of the embodiment shown in FIG. 34, in which the tip 102 is fitted in the recessed portion of the front end of the shank 101.

Figure 36:
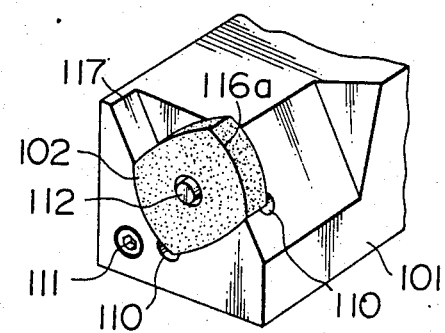
FIG. 36 is a perspective view of another example in which the equilateral square tip is attached by the manner different from that shown in FIG. 35.

FIG. 36 shows another embodiment similar to that shown in FIG. 33, in which the tip mounting portion 117 of the shank 101 is constructed to be widely opened for facilitating the tip attachment.

Figure 37:
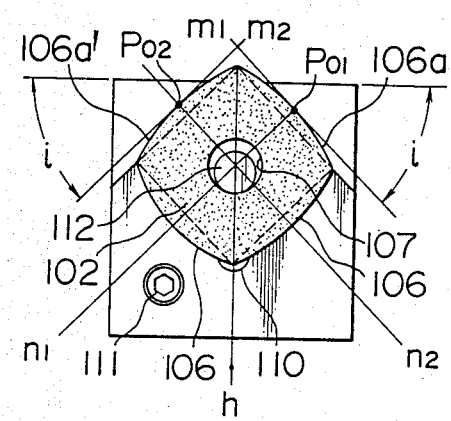
FIG. 37 is a front view of the tool shown in FIG. 36.

FIG. 37 shows a front view showing the tip attaching condition similar to that shown in FIG. 34, but in FIG. 37, upper two cutting edges 106a and 106a' are adapted so as to provide a relief angle towards the central line h of the tip 102 and the shank 101.

Figure 38:
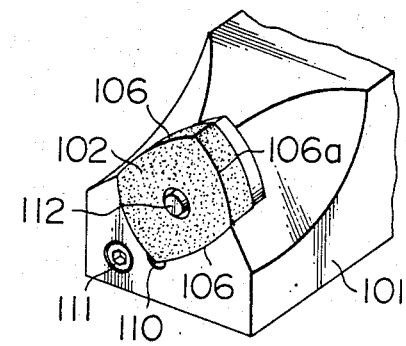
FIG. 38 is a perspective view of further example of the attachment of the equilateral square tip similar to that shown in FIG. 36.

FIG. 38 shows a partial perspective view of the example shown in FIG. 37.

Figure 39:
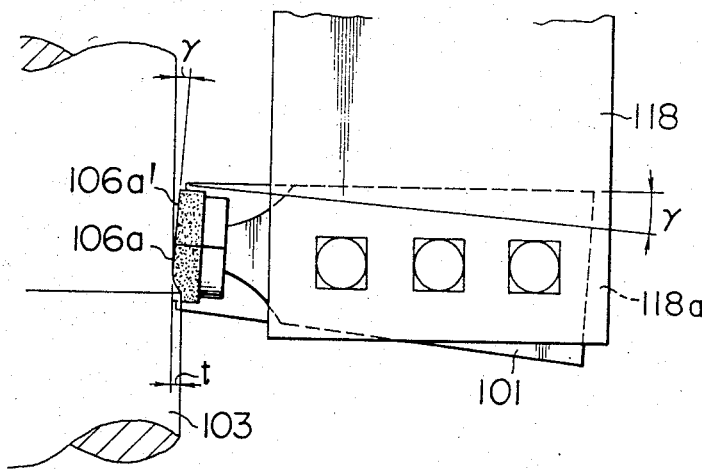
FIG. 39 is a schematic partial view showing a condition in which a work is cut by the oblique edged cutting tool of this invention.

FIG. 39 is a partial plan view showing the cutting tool shown in FIG. 38 in connection with the work 103, in which the shank 101 is tapered with an angle $\gamma$ in the width direction of the shank 101, and accordingly, when one side of the shank 101 is pressed to one side surface 118a of a cutter holder 118, a front cutting edge angle of $\gamma$ is also provided for the tip 102 attached to the front end of the shank 101 and the actual cutting edge portion 106a projects forward of the shank 101. On the contrary, when the cutting edge 106a' is utilized for the cutting operation, the other side of the shank 101 may be pressed to the other side of the cutter holder 118. In addition, in the usual operation when the feeding direction f is reversed, the inclination i becomes −i as an apparent angle, but according to this invention, such a change of the apparent angle is not observed, and there is no change of the flowing mode or shape of the chip.

Figure 40A:
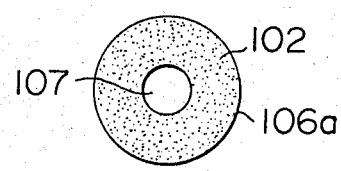
FIGS. 40A and 40B are plan and front views of a ring-shaped tip to be used for the oblique edged tool according to this invention.
Figure 40B:
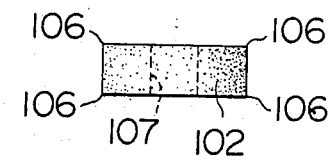

FIGS. 40A and 40B show front and side views of a circular tip 102 according to another example of this invention, in which the circular tip 102 is provided with a cutting edge 106a along the whole peripheral surface thereof.

Figure 41:
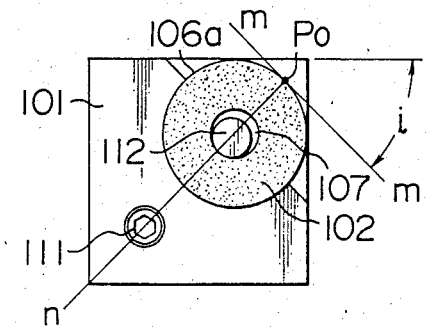
FIG. 41 is a front view of a front end of the tool provided with the ring-shaped tip shown in FIG. 40.

FIG. 41 shows a front view in which the circular tip 102 shown in FIG. 40 is detachably fitted by a lever 112 to the recessed portion of the front end of the shank 101 with the standing state. With the circular tip 102 shown in FIG. 41, the point $P_o$ and portion near that point of the cutting edge of the tip 102 is utilized for the actual cutting operation, and accordingly, the tip 102 is attached to the shank 101 so that the point $P_o$ projects forwardly of the holder and relief angles $\epsilon$ are provided for the front portion of the shank 101 and the tip mounting portion 117.

Figure 42:
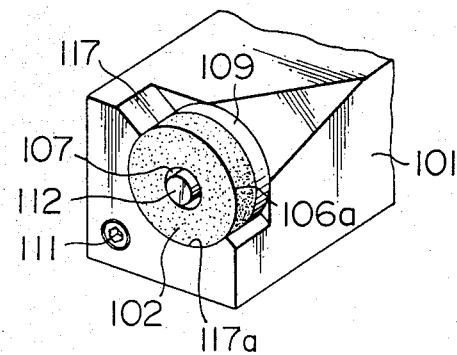
FIG. 42 is a perspective view of the oblique edged tool shown in FIG. 41.

FIG. 42 shows a partial perspective view of the embodiment shown in FIG. 41, in which the shim 109 is interposed between the back surface of the tip 102 and the recessed front end of the shank 101. With the embodiment of the circular tip 102 illustrated in FIG. 42, the whole peripheral cutting edge 106a is utilized for the cutting operation subsequently by rotating the same in consideration of the worn degree of the point $P_o$ of the cutting edge 106a, thus being economical. In addition, since the circular tip is not provided with a cutting corner edge, a cutting depth is set to be relatively large thereby to facilitate wide use thereof, particularly for the machining of the inner peripheral surface of a work.

The shim 109 is usually interposed between the tip 102 made of a sintered carbide material and the shank 101 made of a material having relatively low hardness for preventing the shank 101 from damaging, but the location of the shim 109 is not essential for this invention which will be understood by those skilled in the art.

Figure 43:
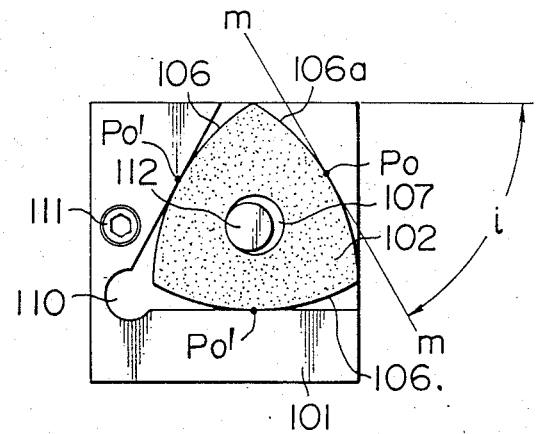
FIGS. 43 and 44 show further modifications of the oblique edged tool provided with the triangular tips.
Figure 44:
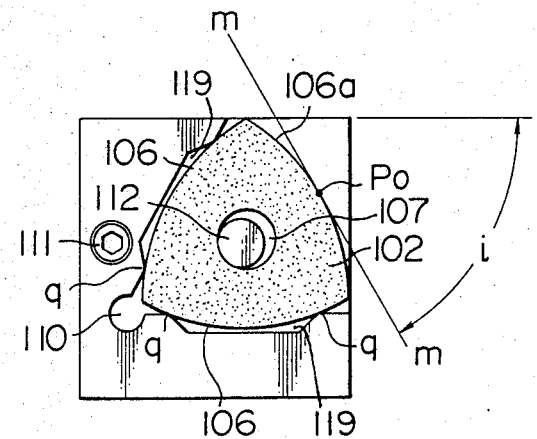

In the embodiments disclosed hereinbefore, although wall portions 117a of the tip mounting portion 117 of the shank 101 are formed so as to have curved shapes corresponding to the outer configuration of the tip to be used, the wall portions may be constructed to be straight walls as shown in FIG. 43 or to have escape grooves 119 at two edge points q of which the cutting edges 106 of the tip 102 contact to support the tip 102 as shown in FIG. 44. Of course, the alternations described above mayh be applied to the shank 101 for the square tip and the circular tip. Moreover, although in the foregoing embodiments, the rotating speed is endowed by rotating the work, it is of course possible to rotate or linearly move the cutting tool. In addition positive tips can be utilized instead of negative tips.

Finally, this invention will be summarized as follows for the aid of the easy understanding of this invention. Namely, this invention relates to an oblique edged cutting tool provided with a front end portion to which is attached a tip of an indexable throw-away type having an outer configuration radially symmetrical about its geometric center, and the tip is provided with a plurality of straight or curved cutting edges having substantially the same length, respectively. Furthermore, the attachment of the tip can be performed in the manner that the tip is attached to the front end of the cutting tool so as to be substantially parallel or normal to the work surface to be machined.

Further, modified embodiment of this invention will be described hereinafter in conjunction with FIGS. 45 through 61, in which a substantially equilateral tip or circular tip provided with a curved cutting edge having a radius of large curvature, the tips being substantially the same type as those referred to in connection with FIGS. 20 through 44, is attached to the front end of the oblique edged cutting tool so as to be vertical to the surface of a work to be machined under the operating condition.

Figure 45:
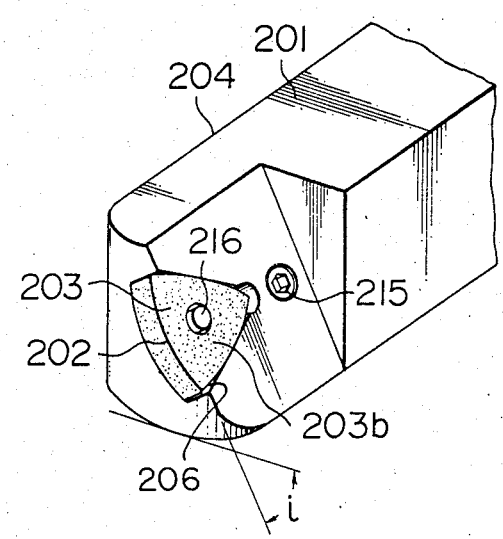
FIG. 45 is a perspective view of the further modification of the oblique edged tool provided with a curved triangular tip according to this invention.

FIG. 45 shows a perspective view of a further modified example according to this invention, in which a substantially triangular tip 203 provided with a curved cutting edge 202 and having considerably large radius of curvature is made of a hardened material and detachably fitted to a tip mount portion 206 formed obliquely at the inclined end surface portion of a holder 204 of a cutting tool 201. The inclination i of the tip 203, i.e. the cutting edge 202 thereof, is preferably defined to approximately 30°~70°.

Figure 46:
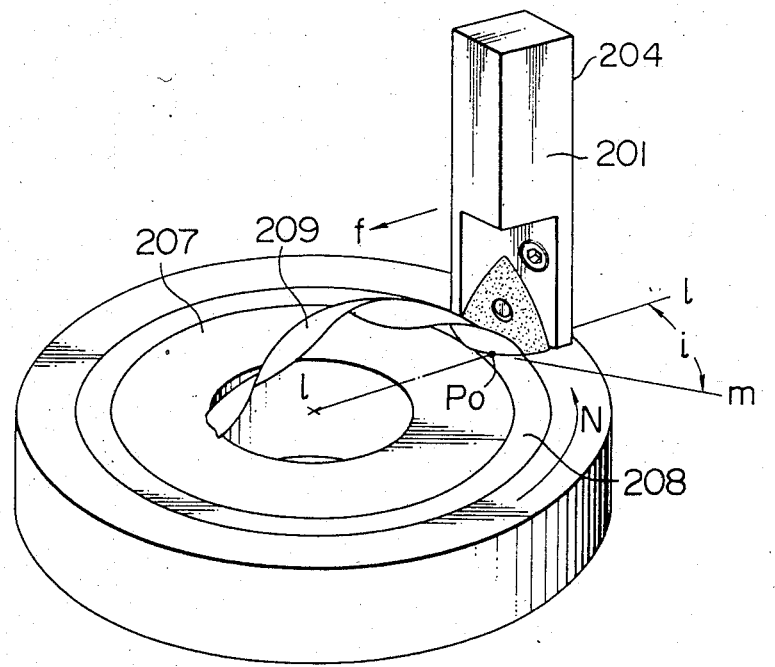
FIG. 46 is a perspective view showing a cutting condition of a work in use of the tool shown in FIG. 45.

FIG. 46 is a perspective view showing a cutting operation condition of a flat surface 208 of a ring-shaped work 207 in use of a vertical boring and turning machine, for example, having the cutting tool 201 provided with the curved triangular tip 203 as shown in FIG. 45. Referring to FIG. 46, the holder 204 is positioned so that the longitudinal axis thereof is normal to the surface 208 of the work 207 to be machined and the intermediate point $P_o$ and the portion near the point $P_o$ of the curved cutting edge are entered into the work surface 208. A chip 209 produced is flown out along the oblique cutting edge in a twisted condition and may be wound inside of the rotating work 207.

Figure 47:
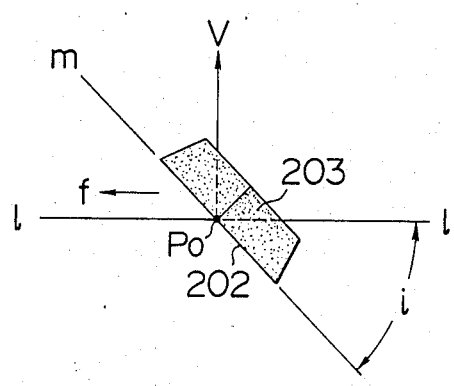
FIG. 47 is a schematic illustration for showing the inclined condition of the tip provided with the curved cutting edge.
Figure 48:
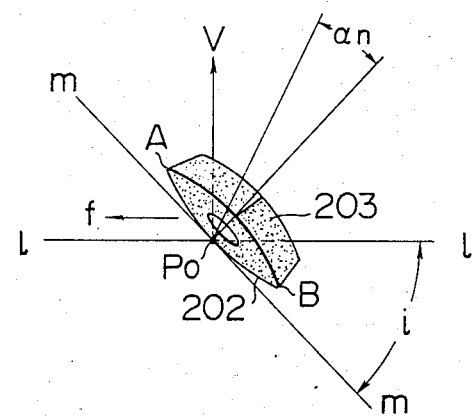
FIG. 48 shows a cutting tip inclined by a certain normal rake angle of $\alpha_n$ in the cutting operation.

FIG. 47 is a schematic view for explaining the relationship between the inclination i of the cutting edge 202, i.e. the tip 203, and the actual cutting operation and shows the condition viewed from a point directly above the drawing surface in which the cutting edge 202 of the tip 203 is entered into the work surface positioned in the same plane as the drawing surface. Referring to FIG. 47, the inclination i of the cutting edge is defined by a tangential line m at the point $P_o$ of the curved cutting edge 202, which is linearly shown at an appearance in this condition, intersecting a line l normal to the cutting direction V. In the example shown in FIG. 47, although there is shown a case where a normal rake angle of the curved cutting edge 202 is zero, FIG. 48 shows a case where the normal rake angle is a certain positive angle $\alpha_n$. In the latter case shown in FIG. 48, the oblique edged tip 203 is inclined by the angle $\alpha_n$ with respect to a plane normal to the drawing surface, and the angle $\alpha_n$ is generally selected from $-6°$ to $+6°$, and in a specific case where a grooved recess or inclined rake surface such as chip breaker or chip former is provided for the rake surface of the cutting edge 202, the angle $\alpha_n$ may take an angle of approximately $+20°$.

Figure 49:
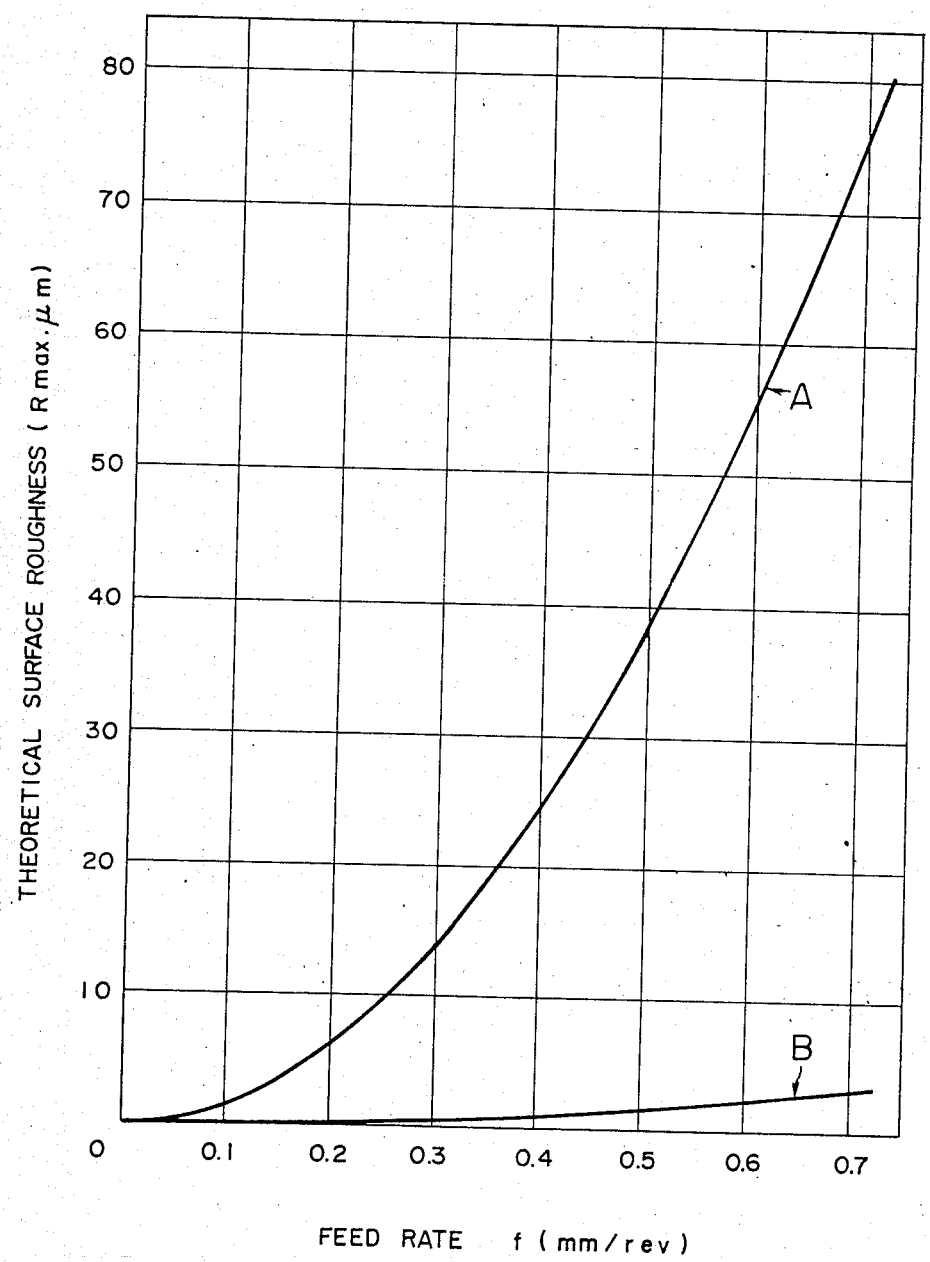
FIG. 49 is a graph for showing curves representing the maximum surface roughness of a machined work.

FIG. 49 is a graph for showing curves A and B which represent the theoretical maximum surface roughnesses of the work in case of the conventional cutting tool and the oblique edged tool according to this invention respectively.

The following Table 3 shows theoretical equations and numerical values for obtaining the curves shown in FIG. 49.

TABLE 3

| Cutting Tool | Theoretical Equation for Surface Roughness | Example of Numerical Value |
| --- | --- | --- |
| Conventional cutting tool | $R_{max \cdot th} = \dfrac{f^2}{8R_a}$ | $R_a = 0.8$ (mm) |
| Cutting tool of this invention | $R_{max \cdot th} = \dfrac{f^2}{8R_b \cos^2 i}$ | $R_b = 300$ (mm) <br> $i = 45°$ |

In the Table 3, f is feed amount (mm/rev.), $R_a$ is a radius (mm) of the nose of the cutting edge of the conventional tip and $R_b$ is a radius of curvature of the curved cutting edge of the oblique edged tool of this invention. With the conventional cutting tool, a tip provided with a nose having relatively small radius is generally used for suppressing the generation of undesirable vibrations in the finishing cutting operation and a tip having the nose radius of 0.4~0.8 mm is widely used. The curve A in FIG. 49 shows a theoretical surface roughness obtained by the use of the conventional tip having the nose radius of 0.8 mm. On the other hand, the curve B in FIG. 49 also shows a theoretical surface roughness obtained by the use of the tip provided with the curved cutting edge and having the radius of curvature of 300 mm and inclined so as to suppress the generation of the chatter vibrations. As will be understood from the curves shown in FIG. 49, the oblique edged cutting tool according to this invention can obtain the machined surface roughness superior to that obtained by the conventional cutting tool throughout the entire feed amount of the tool, and moreover, the difference between the surface roughnesses obtained by those tools becomes widened as the feed amount becomes large, which means that the oblique edged tool of this invention is more suitable for high feed amount cutting operation to obtain the superior machined surface roughness of the work.

Figure 50:
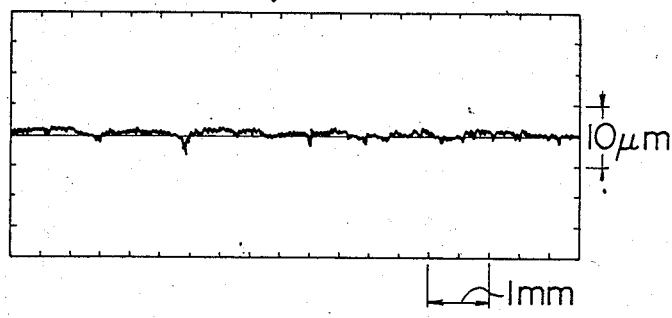
FIG. 50 shows a certain example of the surface roughness of the machined work obtained by using the cutting tool of this invention.

FIG. 50 shows one example of the machined surface roughness of the work obtained by the use of the oblique edged tool according to this invention under or with conditions shown in the following Table 4.

TABLE 4

| Items | Cutting Conditions |
| --- | --- |
| Substance of work | S 45C |
|  | (Carbon steel for machine structure use) |
| Machine tool | Extension boring and turning mill |
| Cutting speed | 150~250 m/min. |
| Feed amount | 0.4 mm/rev. |
| Depth of cut | 0.05 mm |
| Cutting tool (tip) | Inclination (i) = 45° |
|  | Nose radius R = 300 mm |

Figure 51:
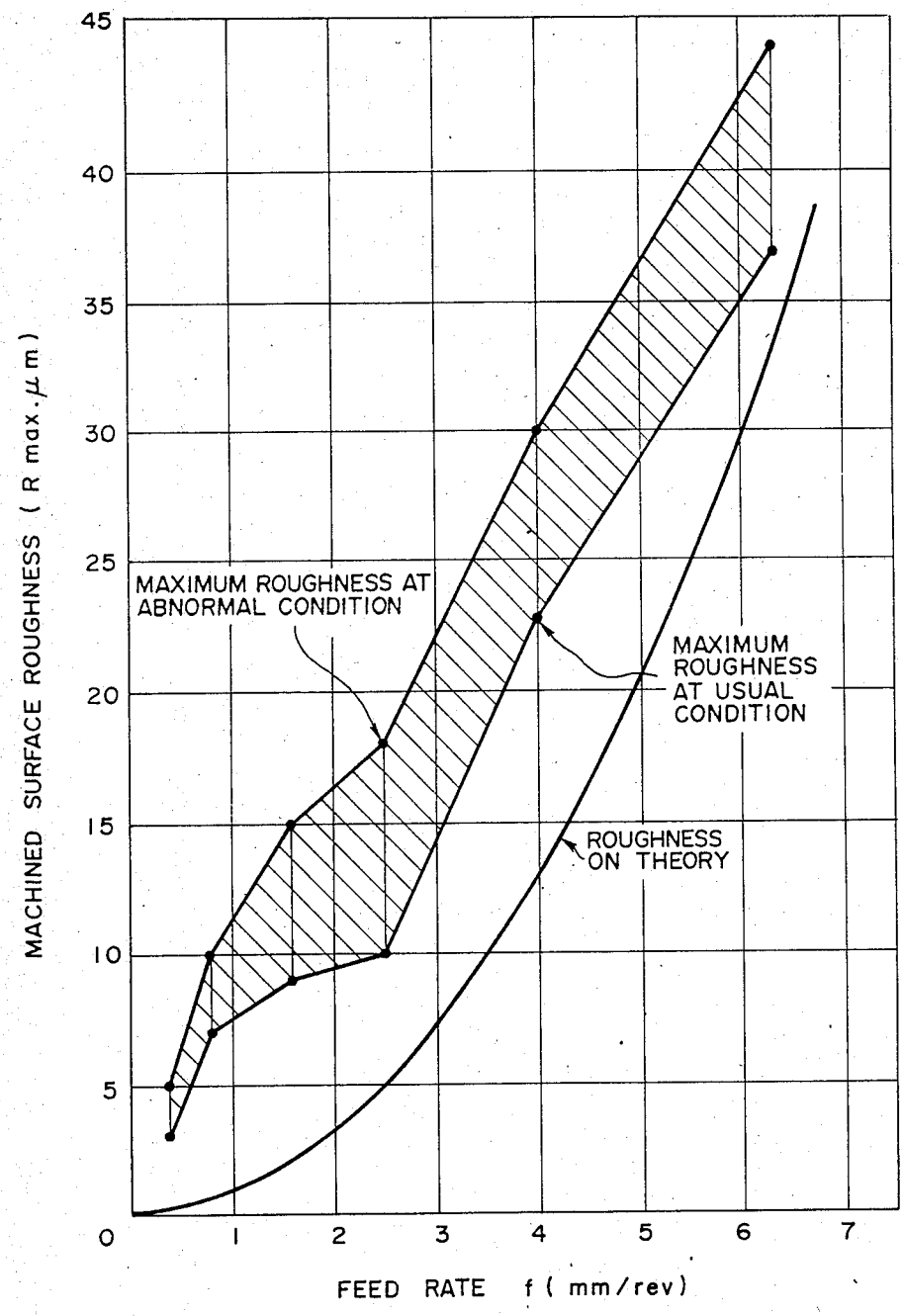
FIG. 51 is a graph showing the actual or theoretical surface roughness condition of the machined work in connection with the feed amount of the cutting tool of this invention.

FIG. 51 shows a relationship between the feed amount f (mm/rev.) and the machined surface roughness ($R_{max}\mu m$) of the work in a case where the oblique edged tool according to this invention is used under or with the cutting conditions of cutting speed: 150~250 m/min.; depth of cut: 0.05 mm; feed amount: 0.4~6.3 mm/rev.; dry type cutting; material of a work to be machined: S45C; and used tool: oblique edged tool having inclination angle of 45° and radius of curvature of 300 mm. In FIG. 51, the theoretical maximum surface roughness and the actual surface roughness at the experiment of the machined work are shown. The conventional cutting tool cannot be used for the finishing surface working with such high feed amount as shown in FIG. 51. However, according to the oblique edged tool of this invention, as shown in FIG. 50, the surface roughness of the machined work below $R_{max}=5$ μm was obtained with the feed amount of f=0.4 mm/rev. and the measured surface roughness approximately to the curve showing the theoretical surface roughness was obtained with the expanded feed amount up to f=6.3 mm/rev. as shown in FIG. 51. On this point, with the conventional non-oblique edged tool, the measured surface roughness worse by several times than the theoretical surface roughness will be observed because of the generation of chatter vibrations, wearing of the cutting edge, production of burrs, adhesion of chip to the cutting edge or the like. The reasons why the surface roughness obtained by the cutting tool of this invention is superior to that obtained by the conventional cutting tool will be considered hereinbelow, but the most significant reason resides in the increasing of the effective rake angle originated by inclining the cutting edge of the tool.

Figure 52:
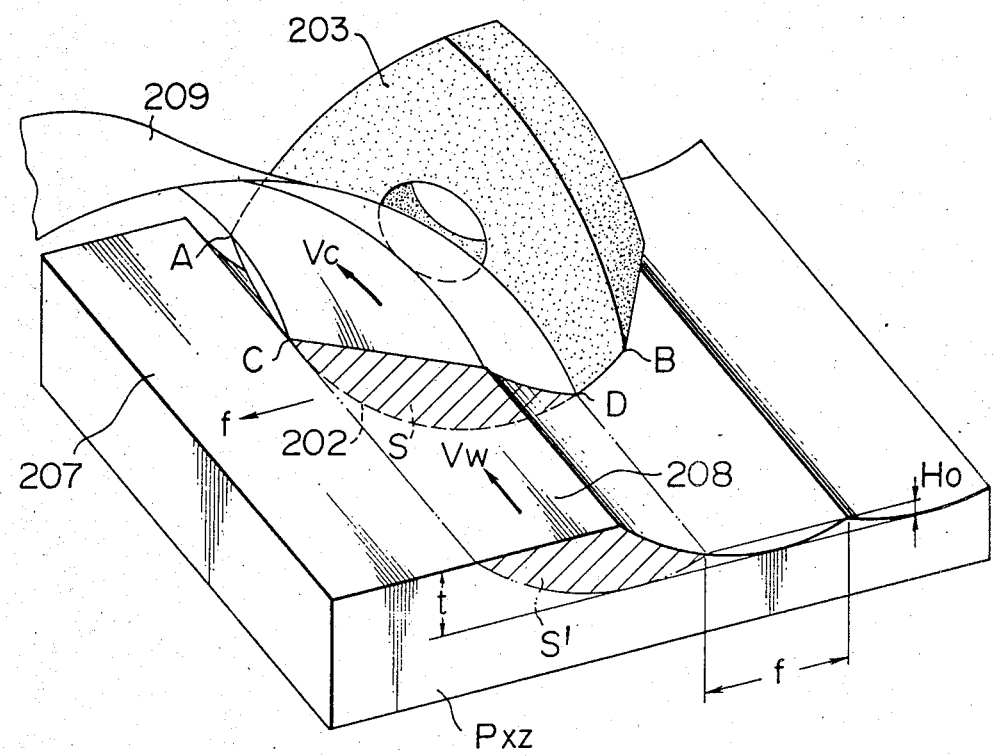
FIG. 52 is a perspective view of the curved cutting edged tip in an actual cutting operation.

FIG. 52 shows a partial perspective view in an enlarged scale of the oblique edged tool in an actual cutting operation according to this invention, in which the tip 203 is positioned vertically with its flat surface being normal to the surface 208 to be machined of the work 207 and the curved cutting edge 202 having large radius of curvature cuts the work surface to obtain the gradually increasing depth of cut, and after reaching the maximum depth of cut, the work is cut with the gradually decreasing depth of cut thereby to obtain the finely machined work surface.

Figure 53:
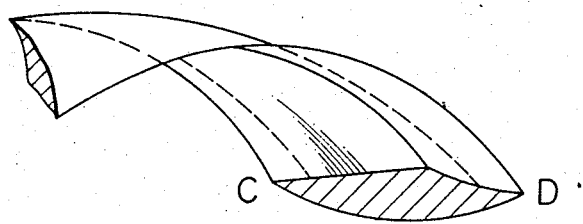
FIG. 53 is a partial perspective view of a chip.

Referring to FIG. 52, the cross section S of a portion of the work to be machined and the projected section S′ of the section S on the plane $P_{xz}$ have shapes each having relatively wide thickness at the central portion and relatively narrow thickness at the end portions as shown by oblique lines in FIG. 52. The cross section of the chip has substantially the same shape as that of the cross section of the cut work as shown in FIG. 53. The cross section of the chip made of mild carbon steel exhibits pale white silver color at both end portions and dark blue color at the central portion and this fact means that the temperature of the chip is relatively low at the end portions and relatively high at the central portion of the chip. Accordingly, the fact that the end portions of the chip which contact the machined work surface provide the relatively low temperature means that the machined work surface is less thermally deformed or damaged.

Referring to FIG. 52, the work fed at a cutting speed $V_w$ towards the cutting edge 202 is cut thereby and the chip 209 cut away is flown out at a speed $V_c$ in a direction having an angle ηc which is determined by the inclination i of the cutting tip. The chip 209 is as a whole flown away in the inclined direction of the cutting edge 202 of the tip 203 with a twisted manner.

Figure 54:
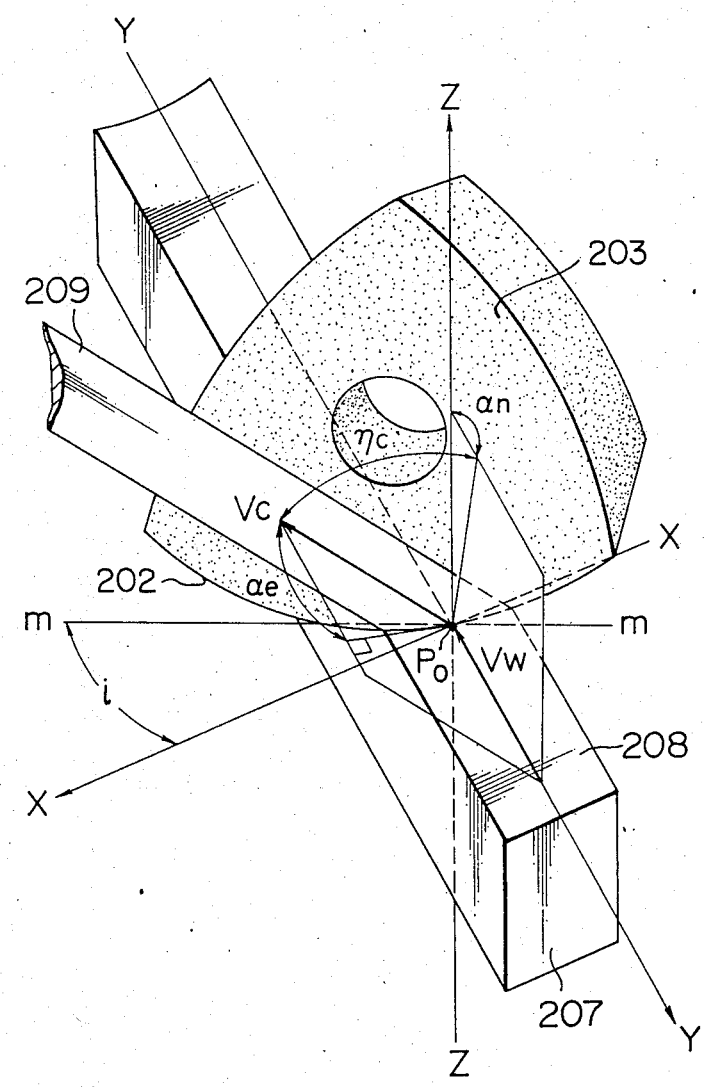
FIG. 54 is a view similar to FIG. 30 for explaining the cutting verocity directions in connection with the cutting angles during the cutting operation.

FIG. 54 shows a view for explaining relationships between respective angles and speeds of the chip 209 and the curved cutting edge 202, and in FIG. 54, the feed amount f shown in FIG. 46 or 52 is eliminated for the clarification of the explanation and the width of the work 207 is narrowed less than the width of the cutting edge 202. In addition, the chip 209 is linearly flown out without twisting for clearly showing the chip flowout direction. In FIG. 54, a symbol $V_w$ designates a cut speed of the work 207, $V_c$ is a flow-out speed of the chip 209, $\alpha_n$ is a normal rake angle, $\alpha_e$ is an effective rake angle, and ηc is a chip flow-out angle.

In general, when the cutting edge 202 is inclined by an angle i with respect to the direction normal to the cutting direction, the chip flow-out angle ηc is an angle constituted by a plane normal to the cutting edge 202 and the chip flow-out direction and measured on the rake surface of the tip 203, and the following equation is established from a geometrical view point.

$$\sin\alpha_e = \sin\eta c \cdot \sin i + \cos\eta c \cdot \cos i \cdot \sin\alpha_n \quad \ldots (6)$$

In the equation (6), the normal rake angle $\alpha_n$ is a rake angle in a plane normal to the cutting edge and the machined surface of the work and is set at the designing time of the cutting tool, and accordingly, the normal rake angle $\alpha_n$ is easily measured. The effective rake angle $\alpha_e$ is a rake angle in a plane including the cut speed $V_w$ and the chip flow-out speed $V_c$ and is the most important rake angle for a cutting mechanism. With the equation (6), it will be found that the effective rake angle $\alpha_e$ can be calculated when the chip flow-out angle ηc is obtained. In this case, as a result of the experiment, it was found that the effective rake angle $\alpha_e$ is larger than the normal rake angle $\alpha_n$ and that a cutting operation can be done with high cutting performance by inclining the cutting edge of the tip even if the cutting tool is itself not provided with a sufficiently large rake angle.

Figure 55:
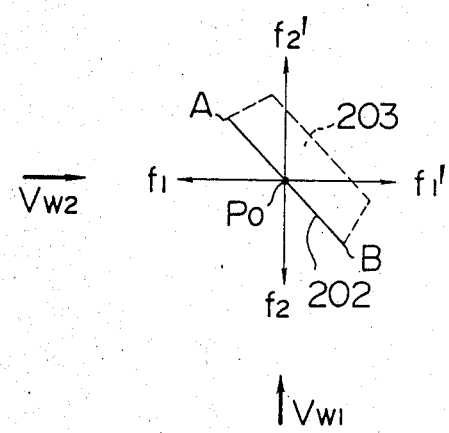
FIG. 55 is a view for explaining the relationship between the cutting direction and the feeding direction of the tip based on the cutting operation for this invention.

FIG. 55 is a view for explaining the relationship between the cutting direction and the feeding direction of the tip 203 on the point $P_o$ of the cutting edge 202, and in this figure, only the projected cutting edge 202 is shown by a solid line. In FIG. 55, in a case where the cutting direction is represented by the arrow $V_{w1}$, the feeding direction will be chosen to the direction $f_1$ or $f'_1$, while represented by the arrow $V_{w2}$, the feeding direction will be chosen to the direction $f_2$ or $f'_2$, thus being convenient for the practical use of the cutting tool.

Figure 56:
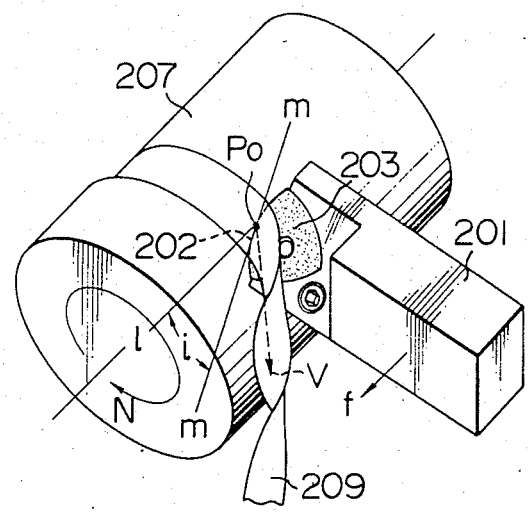
FIG. 56 is a perspective view showing work cutting condition of a cylindrical work.

FIG. 56 is a perspective view showing a work cutting operation in which a cylindrical work 207 is cut by an oblique edged tool 201 shown in FIG. 45. The chip 209 is flown out with the twisted condition along the inclined rake face of the tip 203. As shown in FIG. 56, according to the cutting tool of this invention, the chip 209 is flown away in a predetermined direction without dispersing randomly as observed in the conventional cutting tool, so that the chip can be easily disposed of.

Figure 57:
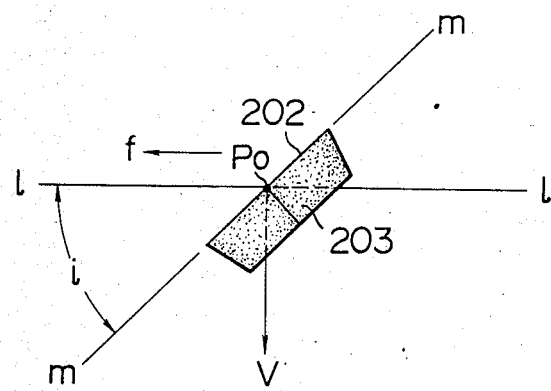
FIG. 57 is a schematic view, similar to FIG. 47, showing a relationship between the inclination of the tip edge of the cutting operation shown in FIG. 56.

FIG. 57 is a schematic view, similar to FIG. 47, showing a relationship between the inclination i of the cutting edge 202 and the cutting operation shown in FIG. 56, as viewed from a point directly above the drawing surface in which the cutting edge 202 of the tip 203 is entered into the work surface positioned in the same plane as the drawing surface. The inclination i of the cutting edge 202 in FIG. 57 is defined by the same manner as that described in connection with FIG. 47.

Modifications of the embodiment set forth hereinbefore in connection with FIGS. 45 through 57 will be described hereunder in conjunction with FIGS. 58 through 61 in which like reference numerals are added to elements or portions corresponding to those of the former embodiment.

Figure 58:
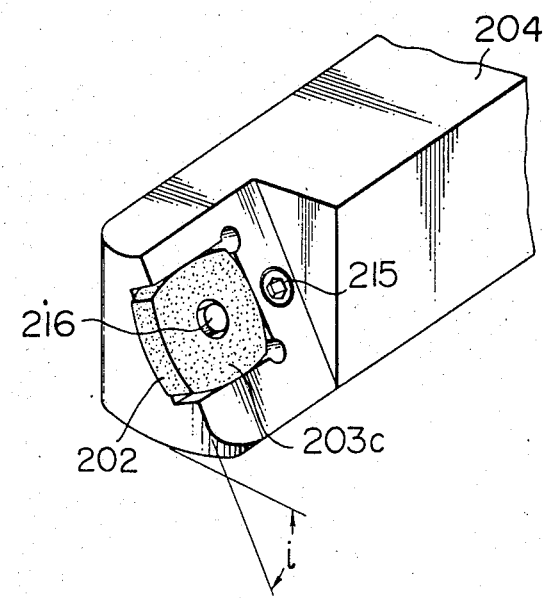
FIG. 58 is a perspective view of a modified example of the oblique edged tool in which a substantially square tip is attached.

FIG. 58 shows a partial perspective view of an oblique edged cutting tool in which a tip 203c is provided with substantially equilateral square configuration and the cutting edge 202 has a radius of large curvature, and the tip 203c is fitted to a tip mount portion formed in the front end of the holder 204 in an inclined manner. Although, with this equilateral square tip 203c, substantially the same cutting operation or condition is attained as that described with reference to the equilateral triangular tip, the numbers of cutting edges are increased, thus being economical.

Figure 59:
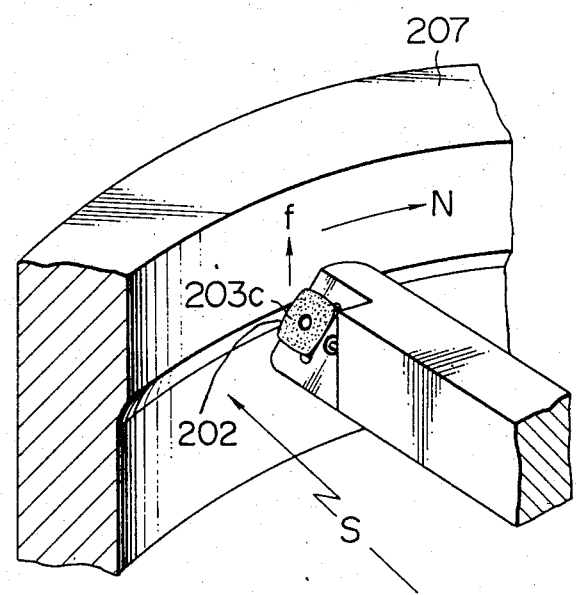
FIGS. 59 and 60 show cutting conditions of the tool shown in FIG. 58 in which the inner surface of the cylindrical or ring-shaped work is cut.

FIG. 59 shows a perspective view in which the oblique edged cutting tool 201 shown in FIG. 58 cuts the inner surface of the cylindrical work 207. With this cutting operation, the radius R of curvature of the curved cutting edge 202 will have to be satisfied with the following condition.

Figure 60:
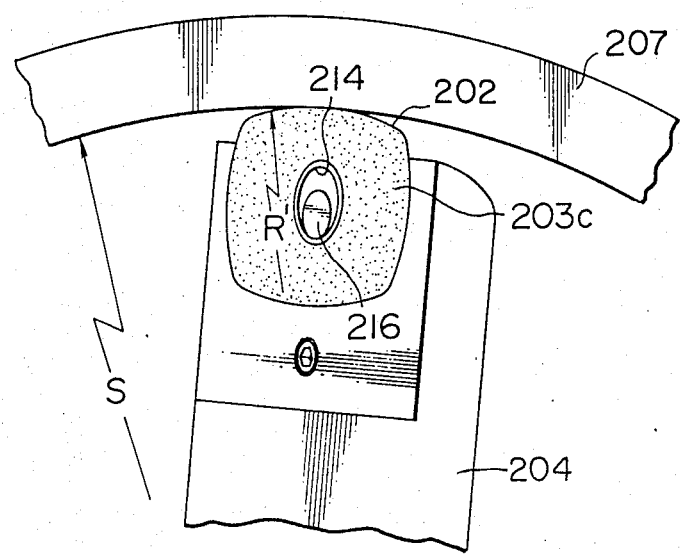

FIG. 60 is a partially enlarged plan view of FIG. 59, in which the curved cutting edge 202 of the tip 203c attached to the holder 204 should be selected so as to have an apparent radius R' of curvature smaller than the inner diameter of the work 207 to be machined when viewed from a point directly above the drawing surface. Because the curved cutting edge 202 is inclined, when viewed from the upper point, the apparent radius R' is smaller than the actual radius R, so that in an acutal operation, any problem will be obviated by selecting the tip provided with the curved cutting edge having a radius R of curvature being smaller than the inner radius S of the work to be machined.

Figure 61:
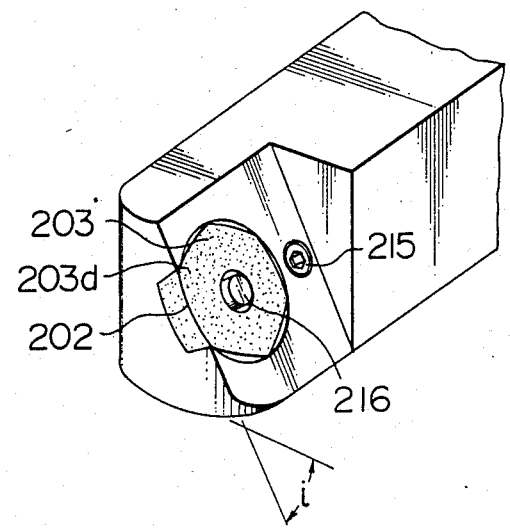
FIG. 61 is a partial perspective view of a further modified embodiment of the oblique edged tool in which a hexagonal tip is attached according to this invention.

FIG. 61 shows a partial perspective view of a further modification of the oblique edged cutting tool in which a tip 203d is provided with substantially hexagonal configuration, the cutting edge 202 has a radius of large curvature, and the tip 203d is fitted to a tip mount portion formed at the front end of the holder 204 in an inclined manner. Although, with this equilateral hexagonal tip 203d, substantially the same cutting operation or condition is attained as that of the equilateral square tip, the number of cutting edge is further increased, thus being economical.

According to the embodiments represented by FIGS. 45 through 61 of this invention, it will be also easily understood by those skilled in the art that substantially the same advantages or effects as those (1) through (7) summarized before with respect to the former embodiments represented by FIGS. 20 through 44 can be obtained.

Although not disclosed in detail in the above description, it will be easily understood that the tip provided with a hole at its central portion is availably used and the geometric center thereof substantially accords with that of the hole, but is not necessarily limited to the tip of this type according to this invention.

Regarding the embodiments or examples represented by the illustrations of FIGS. 20 through 60, although the tips might be described as a triangular, square, or equilateral tip, the tip has a curved cutting edges, as is apparent from the disclosure, and accordingly, the tip may be called "substantially" triangular, square or equilateral tip.

In the foregoing description of the preferred embodiments according to this invention, there are referred to oblique edged cutting tools each comprising a holder and an indexable throw-away tip provided with curved outer peripheral surfaces and flat upper and lower surfaces as viewed in the thickness direction such as shown in FIGS. 22A and 33A. According to this invention, however, the other tips of the type each provided with flat outer peripheral surfaces and at least one of curved upper and lower surfaces are applicable to the tool holder as described hereinafter with reference to FIGS. 62 through 75.

Figure 62:
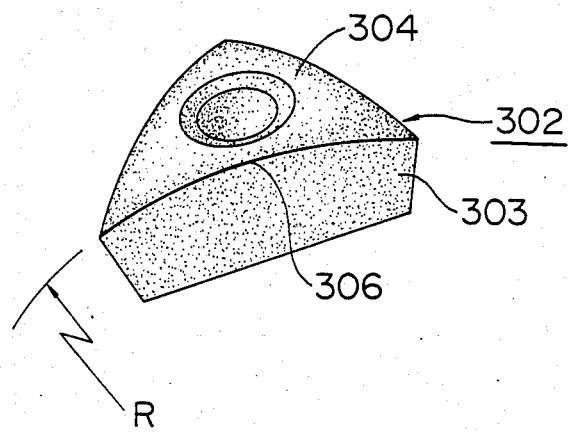
FIGS. 62 and 63 are perspective views of tips having substantially the traingular outer configurations in a plan view which are adapted for a cutting tool according to this invention.
Figure 63:
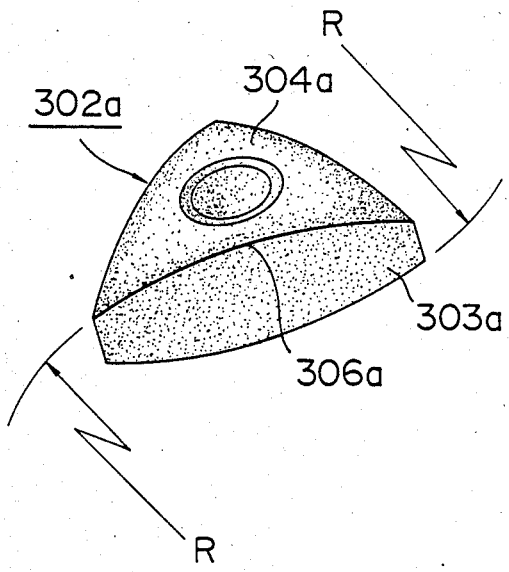

For example, FIG. 62 shows a perspective view of a tip 302 having a triangular outer configuration in a plan view, which is provided with three flat outer peripheral surfaces 303 and a flat lower surface, not numbered, and the cutting edges 306 are defined as contacting lines of the upper edge portions of the peripheral surfaces and the upper curved surface, the cutting edges 306 being of course curved outwardly. FIGS. 63 shows a modification 302a of the tip 302 which is proviced with curved upper and lower surfaces in the thickness direction thereof.

As is apparent from FIGS. 62 and 63, the tips 302 and 302a each has a thickness gradually reduced from substantially the central portion of the upper (and/or lower) surface of the tip towards the apex or corner portion thereof.

Figure 64:
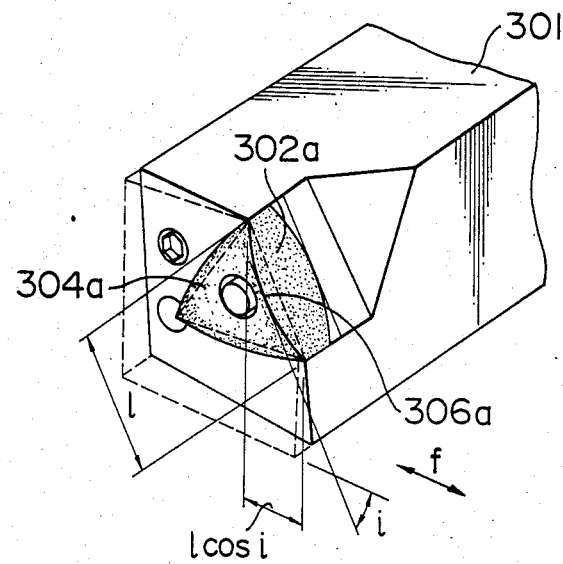
FIG. 64 is a perspective view of a cutting tool of this invention to which the tip shown in FIG. 63 is attached so that the curved cutting edge projects outwardly.

FIG. 64 shows a perspective view of an oblique edged cutting tool of this invention provided with the tip of the type shown in FIG. 63 and the positional relationship of the tip 302a with respect to a tool holder 301 is substantially the same as that described with reference to FIG. 21, so that the detailed description thereabout is now omitted. However, as is apparent from the comparison of FIG. 21 and FIG. 64, the projecting direction of the cutting edges 106a is different from that of the cutting edge 302a, and with this point, the cutting operation or function of the cutting tool provided with the tip 302a is performed in substantially the same manner as that shown in FIG. 45.

Referring to FIG. 64, the effective cutting length of one cutting edge in the feed direction f is l cos i, wherein l is a length of one peripheral surface of the tip 302a and an angle i is an inclination of the cutting edge. In the attached state, an inclination angle is predetermined to be about 30° to 70° and substantially the central portion of the cutting edge 306a project outwardly so that the relief angle is provided in a direction substantially normal to the cutting edge. This state is identical to that described hereinbefore with reference to the other embodiment such as shown in FIG. 45.

Figure 65:
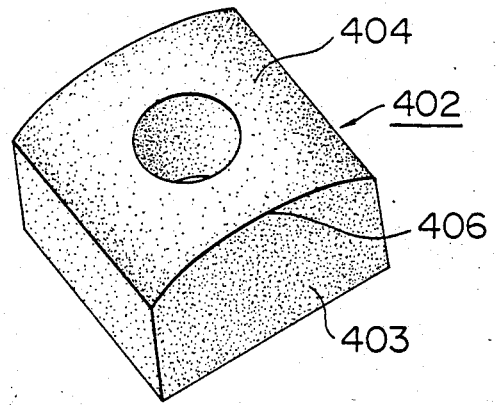
FIGS. 65 and 66 are perspective views of tips having substantially the square outer configurations in a plan view which ar adapted to a cutting tool according to this invention.
Figure 66:
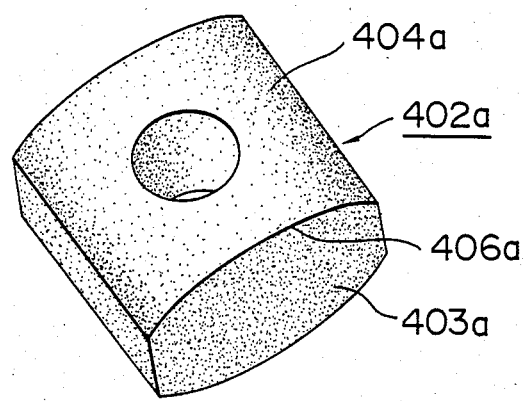

FIGS. 65 and 66 show perspective views of tips of the other type which are also applicable to the oblique cutting tool of this invention. The tips 402 and 402a have substantially square outer configurations in their plan views, and for example, the tip 402 of FIG. 65 is provided with four flat peripheral surfaces and an upper covered surface 404. One cutting edge of this tip 402 is constituted by the contacting edge of one peripheral surface 403 and the curved surface 404 as the curved cutting edge 406 which project outwardly. A tip 402a has two curved surfaces 404a as shown in FIG. 66. The attached state of the tip 402a to the holder 401 is shown in FIG. 67 as a perspective view, and the cutting operation or function of the holder 401 with the tip 402a is substantially the same as that described hereinbefore with respect to the tool shown in FIG. 64, so that the detail thereof is now omitted.

In the case where the tip 302, 302a, 402, or 402a is attached to the oblique cutting tool 301 or 401, as is clearly understood from the plan view, the effective cutting length is elongated in comparison with the case where the tip, shown in FIG. 22a or 33a, having curved peripheral surface is attached to the holder and the strength thereof in the cutting velocity direction will be improved because the thickness of the tip in this direction is increased.

Figure 67:
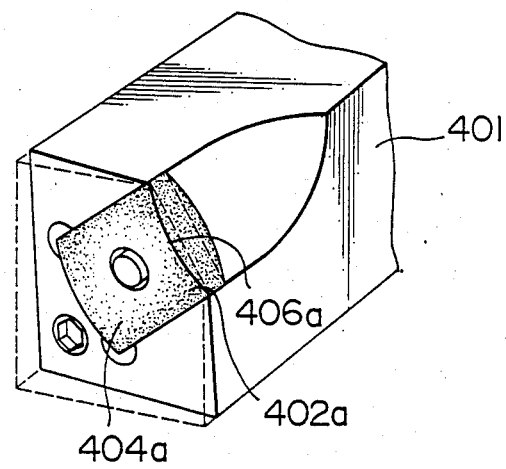
FIG. 67 is a perspective view of a cutting tool of this invention to which the tip shown in FIG. 66 is attached in a manner similar to that of FIG. 64.
Figure 68:
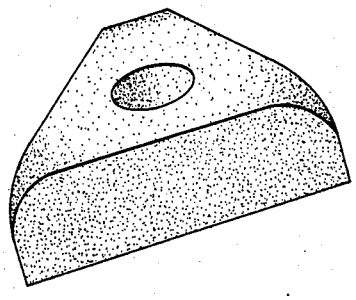
FIGS. 68 through 75 are also perspective views of tips of other types which are however attached to the cutting tool of this invention in the manner similar to that of FIG. 64 or 67.
Figure 69:
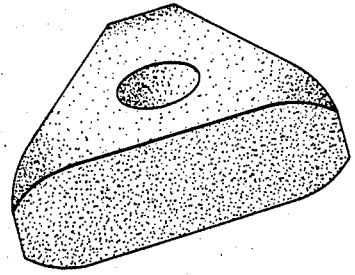
Figure 70:
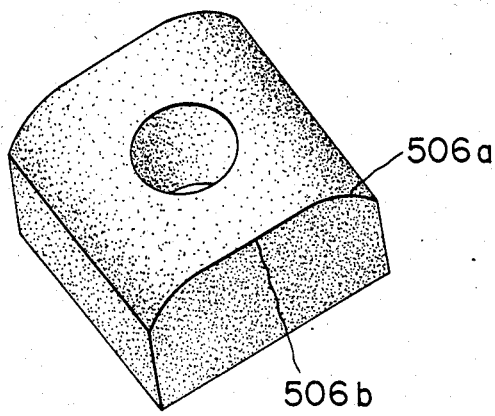
Figure 71:
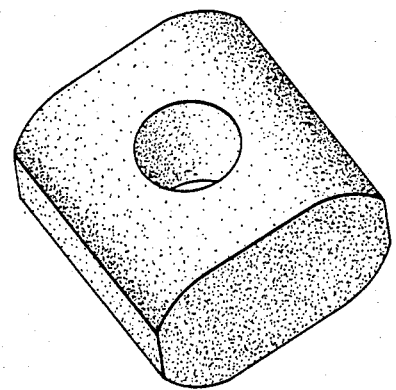
Figure 72:
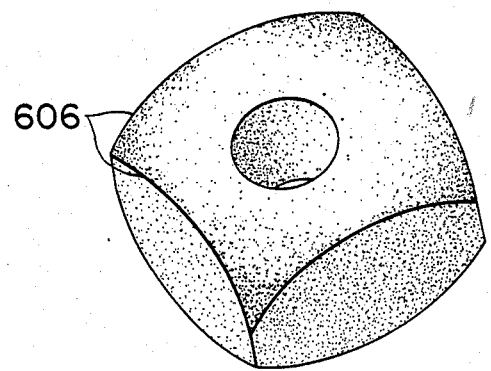
Figure 73:
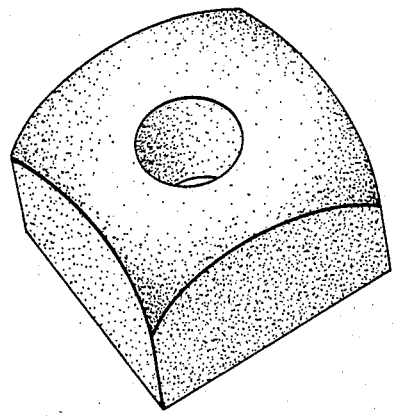
Figure 74:
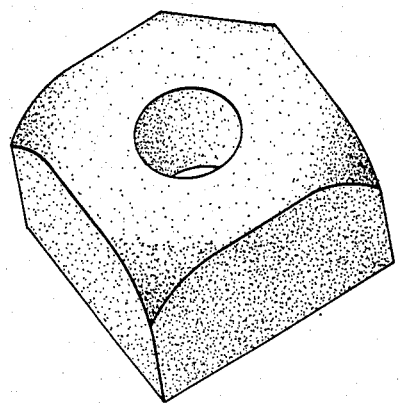
Figure 75:
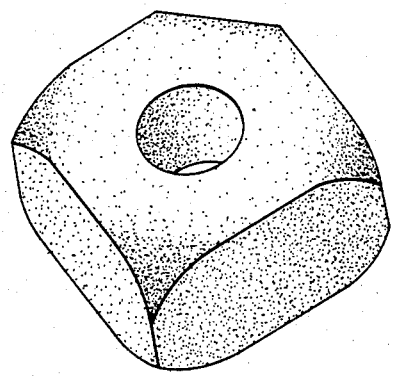

FIGS. 68 through 75 show perspective views of tips of various types but similar to those shown in FIGS. 62, 63, 65 and 66 in their cutting operations or functions in the cases where they are attached to the holder in the manner similar to those shown in FIGS. 64 and 67. For this reason, in the drawings of this application, the examples of the tips of FIGS. 70 and 72 are only referred to and with the other examples, merely the perspective views thereof are illustrated with no specific reference numerals.

The tip shown in FIG. 70 has cutting edges each consisting of curved portions 506a and a linear portion 506b and the tip shown in FIG. 72 has eight curved cutting edges 606. As is apparent from these examples of the tips, according to this invention, tips of various types in shape and in number of cutting edges can be used effectively.

What is claimed is:

1. An oblique edged cutting tool for machining a work, comprising:
    (a) a holder having a front end;
    (b) an indexable throw-away tip comprising:
        (1) a curved surface projecting outwardly;
        (2) a flat surface;
        (3) a curved cutting edge defined by a contacting line between an edge of said curved surface and an edge of said flat surface; and
        (4) an outer configuration radially symmetrical about a geometric center of said tip;
    (c) means for releasably securing said tip to said front end; and
    (d) means for positioning said tip at an inclination angle of from about 30° to about 70° so that said flat surface constitutes a rake face and is positioned substantially normally to a surface of the work to be machined and said curved surface projects outwardly from the front end of said holder so that said curved cutting edge projects forwardly when said tip is secured to said holder;
    wherein said inclination angle is defined as an angle formed by (1) a line tangent to substantially the central portion of an effective cutting edge portion of said cutting edge and (2) a line normal to a cutting velocity direction of said cutting tool and parallel to said work surface.

2. The oblique edged cutting tool according to claim 1 wherein the outer configuration of said flat surface of the tip is radially symmetrical about the geometric center thereof, said tip is provided with at least three outer peripheral surfaces each projecting outwardly, and when said tip is secured to the front end of said holder, said tip is positioned at a relief angle which is defined as an angle formed by (1) a plane coincident with said cutting velocity direction and tangent to said work surface and (2) a line normal to said line tangent to a central point of the effective cutting edge, said central point forming an apex of said relief angle.

3. The oblique edged cutting tool according to claim 2 wherein said tip has a substantially triangular outer configuration.

4. The oblique edged cutting tool according to claim 2 wherein said tip has a substantially square outer configuration.

5. The oblique edged cutting tool according to claim 2 wherein said relief angle is from about 3° to about 11°.

6. The oblique edged cutting tool according to claim 1 wherein the outer configuration of said curved surface of the tip has a polygonal shape in a plan view which is radially symmetrical about the geometric center thereof, said tip is provided with at least three flat outer peripheral surfaces, and said tip has a thickness reduced from a central portion of said curved surface towards apexes of the polygonal shape of said tip.

7. The oblique edged cutting tool according to claim 6 wherein said tip is provided with three flat outer peripheral surfaces.

8. The oblique edged cutting tool according to claim 6 wherein said tip is provided with four flat outer peripheral surfaces.

9. The oblique edged cutting tool according to claim 6 wherein a cutting edge of said tip is constituted by an edge curved in a thickness direction of the tip.

10. The oblique edged cutting tool according to claim 6 wherein a cutting edge of said tip is constituted by edges curved in a thickness direction and a linear edge located between said curved edges in a continuous manner.

11. The oblique edged cutting tool according to claim 1 wherein said tip has an equilateral outer configuration.

12. The oblique edged cutting tool according to claim 1 wherein said tip has a circular outer configuration.

* * * * *